United States Patent
Min et al.

(10) Patent No.: US 12,377,642 B2
(45) Date of Patent: Aug. 5, 2025

(54) FOLDABLE STACK AND FOLDABLE DISPLAY DEVICE AND MANUFACTURING METHOD THEREOF

(71) Applicant: LG DISPLAY CO., LTD., Seoul (KR)

(72) Inventors: Kyungwhon Min, Seoul (KR); Kyungmin Yeo, Paju-si (KR); Suk Choi, Hwaseong-si (KR); Heeyeon Hwang, Hanam-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/825,952

(22) Filed: May 26, 2022

(65) Prior Publication Data

US 2022/0386482 A1   Dec. 1, 2022

(30) Foreign Application Priority Data

May 31, 2021   (KR) .......................... 10-2021-0070007

(51) Int. Cl.
*B32B 27/08* (2006.01)
*B32B 7/12* (2006.01)

(52) U.S. Cl.
CPC ................ *B32B 27/08* (2013.01); *B32B 7/12* (2013.01); *B32B 2307/4023* (2013.01); *B32B 2457/20* (2013.01)

(58) Field of Classification Search
CPC ... B32B 27/08; B32B 7/12; B32B 2307/4023; B32B 2457/20
See application file for complete search history.

(56) References Cited

U.S. PATENT DOCUMENTS

| | | | |
|---|---|---|---|
| 10,559,633 B2 | 2/2020 | Chen | |
| 10,944,080 B2 | 3/2021 | Seo et al. | |
| 11,177,249 B2 | 11/2021 | Lee et al. | |
| 11,610,520 B2 | 3/2023 | Park et al. | |
| 2018/0143499 A1 | 5/2018 | Lim et al. | |
| 2018/0184529 A1 | 6/2018 | Kim et al. | |
| 2018/0190936 A1* | 7/2018 | Lee | B32B 15/04 |
| 2018/0198089 A1 | 7/2018 | Kim | |
| 2018/0267640 A1* | 9/2018 | Virgili | G06F 3/016 |
| 2019/0077121 A1 | 3/2019 | Lee et al. | |

(Continued)

FOREIGN PATENT DOCUMENTS

| | | |
|---|---|---|
| CN | 107210375 A | 9/2017 |
| CN | 111192522 A | 5/2020 |

(Continued)

OTHER PUBLICATIONS

Office Action issued on Dec. 26, 2024 in Chinese Patent Application No. 202210587699.0 with English translation Note: US2020/0393919 cited therein is already of record.

(Continued)

*Primary Examiner* — Travis M Figg
(74) *Attorney, Agent, or Firm* — Morgan, Lewis & Bockius LLP

(57) ABSTRACT

The disclose relates to a foldable stack and a foldable display device and manufacturing method thereof. A foldable stack in embodiments includes a substrate, a pattern layer being disposed along an edge portion on the substrate and comprising one or more of protrusion parts, and an adhesive layer being disposed on the substrate and covering at least a portion of the pattern layer.

22 Claims, 17 Drawing Sheets

(56) References Cited

U.S. PATENT DOCUMENTS

| | | | | |
|---|---|---|---|---|
| 2019/0189962 A1* | 6/2019 | Cho | ............ | H10K 59/8791 |
| 2019/0204867 A1* | 7/2019 | Song | ............ | G06F 1/1641 |
| 2019/0353955 A1* | 11/2019 | Kim | ............ | H10K 59/8791 |
| 2020/0023607 A1 | 1/2020 | Kim | | |
| 2020/0183457 A1* | 6/2020 | Youn | ............ | G06F 1/1681 |
| 2020/0393919 A1* | 12/2020 | Chou | ............ | G06F 1/1601 |

FOREIGN PATENT DOCUMENTS

| | | | |
|---|---|---|---|
| CN | 111508967 A | | 8/2020 |
| CN | 112700719 A | | 4/2021 |
| KR | 10-2018-0008204 A | | 1/2018 |
| KR | 10-2018-0107347 A | | 10/2018 |
| KR | 10-2112864 B1 | | 5/2020 |

OTHER PUBLICATIONS

Office Action issued on May 19, 2025 in Chinese Patent Application No. 202210587699.0 with English translation (Note: CN111192522A cited therein is already of record.).

\* cited by examiner

FOLDABLE STACK AND FOLDABLE DISPLAY DEVICE AND MANUFACTURING METHOD THEREOF

CROSS-REFERENCE TO RELATED APPLICATION

This application claims priority to and benefit of Korean Patent Application No. 10-2021-0070007 filed on May 31, 2021, which is hereby incorporated by reference as when fully set forth herein.

BACKGROUND

Technical Field

The present disclosure relates to a foldable stack and a foldable display device and a manufacturing method thereof, and in particular, a foldable stack and a foldable display device and a manufacturing method thereof that ensures a reduction in the defects of an adhesive layer.

Discussion of the Related Art

Display devices can be embodied as a variety of devices such as a TV, a monitor, a smartphone, a tablet PC, a laptop, a wearable device and the like.

In recent years, various types of flexible display devices such as a foldable display device, a rollable display device, a stretchable display device and the like have been developed, to promote convenience of portability.

Flexible display devices denote display devices to which a display panel having flexibility, i.e., being foldable, rollable, bendable or curvable, is applied while having the display properties of existing planar display devices.

Among flexible display devices, a foldable display device can be folded and take up less space for portability, and when in use, can be unfolded and provide a large display screen.

The foldable display device is folded and unfolded countless number of times.

The folding and unfolding actions can result in an increase in the folding stress, thereby causing damage to the foldable display device.

It is very important to reduce folding stress in the foldable display device.

SUMMARY

In a foldable display device, layers such as a cover window, a deco layer, a polarizing layer, a display panel and the like that provide various functions can be stacked.

An adhesive layer is disposed between each of the layers, and the layers are mutually fixed by the adhesive layer.

In the folding state, a folding curvature radius in a folding portion needs to decrease, to reduce the thickness of the foldable display device.

A decrease in the folding curvature radius leads to an increase in the folding stress.

One of the ways to reduce folding stress is to increase the thickness of the adhesive layer of the foldable display device.

As the thickness of the adhesive layer increases, the surface areas of the lateral surfaces of the adhesive layer being exposed to the outside increase.

As the surface areas of the adhesive layer being exposed to the outside increase, the lateral surfaces of the adhesive layer can be easily contaminated by equipment for processing such as a robot arm and the like, such that an adhesive material is detached or escapes from the lateral surfaces of the adhesive layer. These phenomena are called the detachment of an adhesive material or the escape of an adhesive material.

Additionally, when the modulus of the adhesive material decreases and its flowability increases at high temperature and humidity, the detachment of the adhesive material or the escape of the adhesive material can occur.

The occurrence of the detachment of the adhesive material or the escape of the adhesive material can result in an increase in the defect rate of the foldable display device and a deterioration in the reliability of the foldable display device.

The applicants of the present disclosure performed experiments to decrease folding stress and reduce defects of the adhesive layer. In the experiments, they devised a new foldable stack and a new foldable display device and a new manufacturing method thereof that can decrease folding stress and reduce defects of the adhesive layer.

Accordingly, embodiments of the present disclosure are directed to a foldable stack and a foldable display device and a manufacturing method thereof that substantially obviate one or more of the problems due to limitations and disadvantages of the related art.

An aspect of the present disclosure is to provide a foldable stack and a foldable display device and a manufacturing method thereof that can reduce defects of an adhesive layer, caused by the detachment or escape of an adhesive material of the adhesive layer.

An aspect of the present disclosure is to provide a foldable stack and a foldable display device and a manufacturing method thereof that can effectively control the flow of the adhesive material of the adhesive layer.

An aspect of the present disclosure is to provide a foldable stack and a foldable display device and a manufacturing method thereof in which a plurality of layers can be readily arranged and stacked.

An aspect of the present disclosure is to provide a foldable stack and a foldable display device and a manufacturing method thereof that can reduce the occurrence of a blemish (or mura) caused by a pattern layer being disposed along an edge portion of a substrate.

An aspect of the present disclosure is to provide a foldable stack and a foldable display device and a manufacturing method thereof that can effectively ensure proper optical density of the pattern layer being disposed along the edge portion of the substrate.

An aspect of the present disclosure is to provide a foldable stack and a foldable display device and a manufacturing method thereof that can readily adjust the position of the boundary of the adhesive layer having different modulus.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a foldable stack and a foldable display device comprise a substrate, a pattern layer being disposed along an edge portion on the substrate and including one or more of protrusion parts, and an adhesive layer being disposed on the substrate and covering at least a portion of the pattern layer.

In another aspect, a foldable stack and a foldable display device comprise a first substrate, a first pattern layer being disposed along an edge portion of the first substrate and including one or more of first protrusion parts, an adhesive layer covering the first substrate and at least a portion of the first pattern layer, a second substrate being disposed on the adhesive layer, and a second pattern layer being disposed between the adhesive layer and the second substrate, being disposed along an edge portion of the second substrate and including one or more of second protrusion parts.

In another aspect, a foldable stack comprises: a substrate; a pattern layer being disposed along an edge portion on the substrate and comprising a body part, a plurality of protrusion parts being disposed on the body part and a trench part being disposed between the plurality of protrusion parts; and an adhesive layer being disposed on the substrate and an end portion of which overlaps the trench part.

In another aspect, a foldable display device comprises: a foldable stack; and a display panel being disposed on one surface of the foldable stack, wherein the foldable stack, includes: a substrate; a pattern layer being disposed along an edge portion on the substrate and comprising one or more of protrusion parts; and an adhesive layer being disposed on the substrate and covering at least a portion of the pattern layer.

In another aspect, a manufacturing method of a foldable stack comprises primarily printing a plurality of lower pattern layers along an edge portion on a substrate in a way that the lower pattern layers are spaced from each other, secondarily printing an upper pattern layer to cover the plurality of lower pattern layers, and forming an adhesive layer to cover the substrate and at least a portion of the lower pattern layer and the upper pattern layer.

In embodiments of the present disclosure, the protrusion parts of the pattern layer being formed along the edge portion on the substrate may help to reduce the surface areas of the lateral surfaces of the adhesive layer being exposed to the outside, thereby reducing defects of the adhesive layer, caused by the detachment or escape of an adhesive material.

In the embodiments of the present disclosure, the protrusion parts of the pattern layer being formed along the edge portion on the substrate may interfere with the flow of the adhesive material of the adhesive layer, thereby effectively controlling the flow of the adhesive material.

In embodiments of the present disclosure, the first pattern layer and the second pattern layer, being disposed respectively in edge portions of the first substrate and the second substrate that have the adhesive layer therebetween, may serve as a cohesion and alignment key, thereby readily arranging and stacking a plurality of layers.

In embodiments of the present disclosure, the first protrusion part of the first pattern layer and the second protrusion part of the second pattern layer may be disposed not to overlap each other, thereby preventing an excessive increase in the thickness of a certain area of the pattern layer and reducing the occurrence of a blemish (e.g., mura) caused by the pattern layer.

In embodiments of the present disclosure, a two tone printing method in which the lower pattern layer is primarily printed and the upper pattern layer is secondarily printed is used to form the pattern layer, thereby readily forming a pattern layer having a predetermined thickness or greater and effectively ensuring proper optical density of the pattern layer.

In embodiments of the present disclosure, in the step of primarily printing the plurality of lower pattern layers in a way that the lower pattern layers are spaced from each other, the position of the space between the lower pattern layers may be adjusted, thereby readily adjusting the position of the boundary of the adhesive layer having different modulus.

It is to be understood that both the foregoing general description and the following detailed description are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
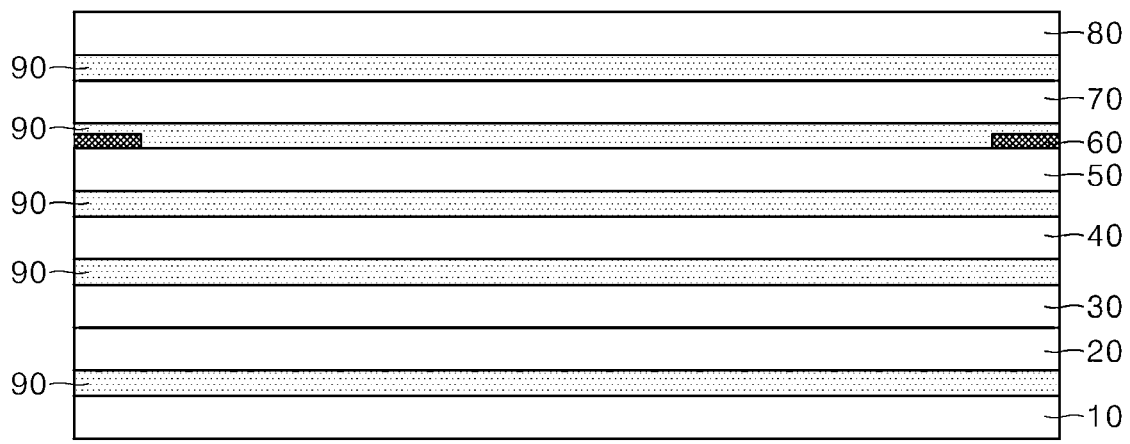
FIG. 1 is a cross-sectional view showing a foldable display device of one embodiment.

Advantages and features in the present disclosure and a method of achieving the same can be clearly understood from embodiments that are described with reference to the accompanying drawings. The subject matter of the present disclosure, however, can be embodied in various different forms, and should not be construed as being limited to the embodiments set forth herein. Rather, the embodiments are provided as examples so that the present disclosure can be thorough and complete and that the scope of the disclosure can be fully conveyed to one having ordinary skill in the art. The subject matter of the present disclosure should be defined only according to the scope of the appended claims.

The shapes, sizes, ratios, angles, number and the like of the components illustrated in the drawings provided for describing the embodiments of the present disclosure are given only as examples, and the subject matter of the present disclosure is not limited by the particulars in the drawings. Throughout the disclosure, like reference numerals denote like components. In describing the subject matter, detailed description of well-known technologies relevant to the present disclosure is omitted if it is deemed to make the gist of the disclosure unnecessarily vague. Throughout the disclosure, the terms "comprising", "having", "being comprised of" and the like would imply the inclusion of any other component, unless the terms are used with the term "only". Further, the singular forms "a", "an" and "the" are intended to include the plural forms as well unless explicitly described otherwise.

In describing a component, the margin of error should be included, though not explicitly described.

In the disclosure, when spatial terms such as "being on", "being in an upper portion", "being in a lower portion", "being adjacent to" and the like are used to describe a position relationship between two components, one or more additional components can be interposed between the two components unless terms such as "right" or "directly" are used.

When temporal terms such as "after", "next", "following", "before" and the like are used to describe a temporal order, one or more additional events can be interposed between two events unless terms such as "right" or "directly" are used.

In describing components, terms such as first, second and the like can be used. These terms are only intended to distinguish one component from another component, and the components are not limited by such terms. Accordingly, a first component described below can be a second component within the technical spirit of the disclosure.

Features of the embodiments of the disclosure can be partially or entirely mixed or combined, and can technically interlock and operate in various ways. Further, each embodiment can be embodied independently, or in connection with each other.

Hereafter, a foldable stack and a foldable display device and a manufacturing method thereof that decreases folding stress and reduces defects of an adhesive layer are specifically described.

FIG. 1 is a cross-sectional view showing a foldable display device of one embodiment.

As illustrated in FIG. 1, the foldable display device 1 may include a support layer 10, a display panel 20, a touch panel 30, a polarizing layer 40, a protective layer 50, a cover window 70 and a coating layer 80.

An adhesive layer 90 may be disposed respectively between the layers, and connect or attach or fix each of the layers.

The order of each of the layers constituting the foldable display device 1 is not limited to the order in FIG. 1, and the order in which each of the layers is stacked may change.

The layers constituting the foldable display device 1 are not limited to the layers illustrated in FIG. 1. Layers having various functions may be added, and when necessary, some of the layers may be omitted.

The support layer 10 may be disposed on the rear surface of the display panel 20 and protect the display panel 20 from external moisture, external heat, an external impact and the like.

The support layer 10 may be a back plate that supports the rear surface of the display panel 20. The support layer 10 may include a polyethylene terephthalate (PET) film or a metallic thin film, but not be limited.

A frame may be additionally disposed on the rear surface of the support layer 10 and protect the support layer 10, the display panel 20 and the like.

The frame may be formed in a way that the frame is removed in some areas where the foldable display device 1 is folded, without being formed to correspond to the entire surface of the support layer 10.

For example, the foldable display device 1 may include a folding area that is folded, and a non-folding area that is not folded. The frame may be disposed in the non-folding area rather than the folding area.

For example, a plurality of frames may be disposed in the non-folding area rather than the folding area to decrease folding stress being applied to the frame, thereby minimizing damage to the frame.

The display panel 20 may be disposed on the support layer 10.

The display panel 20 may generate an image to be embodied. The sort of the display panel 20 is not limited but includes an organic light-emitting display panel or a micro light-emitting diode display panel and the like that is advantages in embodying a flexible display device.

The display panel 20 may include a pixel array including a plurality of pixels.

An area corresponding to the pixel array may be a display area, and the remaining area except for the display area may be a non-display area as a bezel area.

The pixel array may be disposed in a pixel area defined by signal lines, and include a plurality of pixels that display an image, based on signals provided to the signal lines.

The signal lines may include a gate line, a data line, a pixel-driving power line and the like.

Each of the plurality of pixels may include a switching thin film transistor in the pixel area, an anode electrode electrically connecting to the switching thin film transistor, a light-emitting element layer being formed on the anode electrode, and a cathode electrode electrically connecting to the light-emitting element layer.

The light-emitting element layer may include an organic light-emitting element being formed on the anode electrode, for example.

The organic light-emitting element may be embodied in a way that each pixel emits light of the same color like white light, or in a way that each pixel emits light of different colors like red, green or blue light, for example.

In another example, the light-emitting element layer may include a micro light-emitting diode element electrically connecting to the anode electrode and the cathode electrode respectively.

The micro light-emitting diode element may be a light-emitting diode that is embodied in the form of an integrated circuit (IC) or a chip, and include a first terminal electrically connecting to the anode electrode and a second terminal electrically connecting to the cathode electrode.

The touch panel 30 may be disposed on the display panel 20.

The touch panel 30 may sense a user's touch input such as a screen touch or a touch coordinate and the like, and sense an input signal based on a user's touch or a tool's touch through the cover window 70.

The touch panel 30 may be embodied using various methods based on sheet resistance, capacitance, optics, or electromagnetism, but not limited.

The touch panel 30 may include a plurality of touch electrodes, and a touch sensor structure including a plurality of touch routing wires for connecting the touch electrodes to a touch sensing circuit, and the like.

The polarizing layer 40 may be disposed on the touch panel 30.

The display panel 20 may include various metallic materials used for a thin film transistor, a signal line, an electrode, a light-emitting element and the like.

External light incident to the display panel 20 may be reflected by the metallic materials, and the reflection of the external light may worsen the visibility of the foldable display device 1.

Since the polarizing layer 40 including a retardation film selectively transmits light, the reflection of the external light incident to the display panel 20 may decrease. Accordingly, the outdoor visibility of the foldable display device 1 may improve.

The protective layer 50 may be formed on the polarizing layer 40.

The protective layer 50 may be a layer having patterns visible to the user even when the display panel 20 does not display an image. The protective layer 50 may be a deco layer, and not limited by the term.

A pattern layer 60 may be disposed along the edge portion of the protective layer 50.

For example, the pattern layer 60 may be disposed on the protective layer 50, to correspond to the bezel area of the display panel 20.

A deco film or a protective film may include the protective layer 50 and the pattern layer 60, for example. Additionally, a separation layer as a surface protection film may be formed on the front surface and the rear surface of the deco film or the protective film, and the separation layer may protect the outer surface of the deco film or the protective film.

When the deco film or the protective film is formed on the polarizing layer 40, the protective layer 50 and the pattern layer 60 that are left after the separation layer separates may be stacked on the polarizing layer 40. Accordingly, the protective layer 50 may support the pattern layer 60 and prevent damage to the pattern layer 60 while the separation layer separates.

The pattern layer 60 may be a decoration layer on which decorations are substantially printed.

The pattern layer 60 may be comprised of various materials such as an organic material and an inorganic material. The materials for the pattern layer 60 are not limited.

The organic material may include black ink or carbon black, for example. The inorganic material may be a material such as a silicon oxide ($SiO_2$) film, a silicon nitride ($SiN_x$) film, metal and the like, for example.

In the case of a pattern layer 60 made of an organic material, photoresist processing, silk printing, coating and the like may be used. In the case of a pattern layer 60 made of an inorganic material, deposition processing and the like may be used.

The pattern layer 60 may be formed into a color layer having the color of black, for example.

In this case, even if the display panel 20 does not display an image, the bezel area of the display panel 20 may be substantially displayed as the same color as the display area of the display panel 20, making a screen of the display panel 20 appear wider.

For example, the pattern layer 60 may be formed into a black matrix.

The black matrix may be applied as a resin-based organic film. For example, a pigmented organic resin and the like such as acryl, epoxy or polyimide resin and the like including any one of carbon black or black pigment may be applied to the black matrix.

The cover window 70 may be formed on the protective layer 50 and the pattern layer 60.

The cover window 70 may protect the protective layer 50, the polarizing layer 40, the touch panel 30, the display panel 20 and the like thereunder from an external impact, moisture, heat and the like.

To this end, glass or a plastic film having impact resistance and light transmittance may be used for the cover window 70.

In the case of a cover window 70 made of glass, a protective film including polyethylene terephthalate (PET) may be additionally formed on one surface of the cover window 70, such that the cover window 70 is prevented from breaking into small pieces due to an external force or stress.

In the case of a cover window 70 formed into a plastic film, an acrylic film, a colorless polyimide film and the like may be used.

The coating layer 80 may be formed on the cover window 70, and protect the cover window 70 from an external impact.

The coating layer 80 may include colorless organic-inorganic hybrid materials. Accordingly, the coating layer 80 may protect the cover window 70 effectively, and reduce deterioration in light transmittance.

The adhesive layer 90 may be formed among the support layer 10, the display panel 20, the touch panel 30, the polarizing layer 40, the protective layer 50, the cover window 70 and the coating layer 80 that are described above, to bond (or connect) or fix each of the layers.

The adhesive layer 90 may be made of a material having a high adhesive force and high transparency.

The adhesive layer 90 in the disclosure may denote a layer ensuring viscosity as well as adhesiveness.

The adhesive layer 90 may have proper adhesiveness such that bubbles or separation do not occur even if the adhesive layer 90 formed between the layers bends, and have viscoelasticity such that the adhesive layer 90 is used for the foldable display device 1.

The adhesive layer 90 may include an acryl-based composition or a silicon-based composition. For example, the adhesive layer 90 may include an optical clear adhesive (OCA) composition or a pressure sensitive adhesive (PSA) composition.

The foldable display device 1 may include a folding area and a non-folding area.

In the state of being folded, the foldable display device 1 has a great thickness. To reduce the thickness of the foldable display device 1 in the state of being folded, a folding curvature radius in the folding area may decrease.

A decrease in the folding curvature radius results in a decrease in the thickness of the foldable display device 1 in the state of being folded, while resulting in an increase in the folding stress.

To decrease the folding stress, the thickness of the adhesive layer 90 of the foldable display device 1 may increase.

Figure 2A:
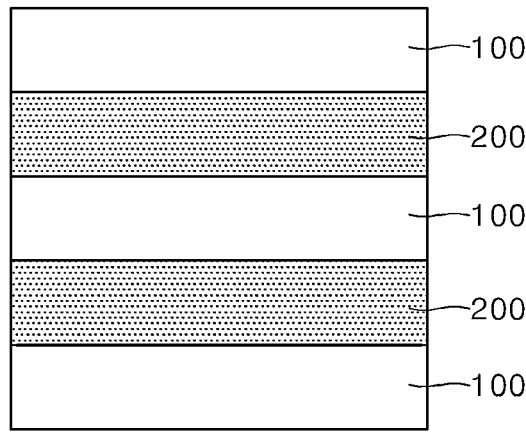
FIGS. 2a and 2b are views respectively showing that an adhesive material is detached and escapes before and after the thickness of an adhesive layer of a foldable stack increases.
Figure 2B:
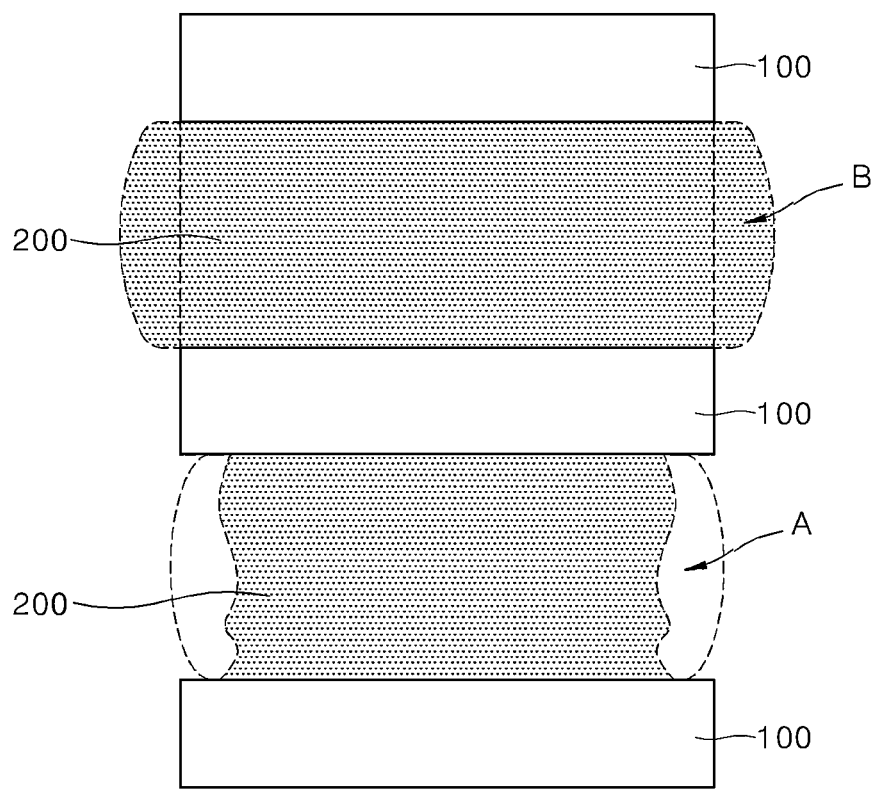

FIGS. 2a and 2b show a foldable stack 2 constituting the foldable display device before and after the thickness of an adhesive layer of the foldable stack increases.

As illustrated in FIG. 2a, in the foldable stack 2, a plurality of substrates 100 may be stacked, and each of the substrates 100 may be fixed by an adhesive layer 200.

In this case, the substrates 100 are disposed on the upper and lower surfaces of the adhesive layer 200 such that the upper and lower surfaces of the adhesive layer 200 are not exposed to the outside. However, the lateral surfaces of the adhesive layer 200 are exposed to the outside.

As the thickness of the adhesive layer 200 increases to reduce the folding stress, as illustrated in FIG. 2b, the surface area of the lateral surface of the adhesive layer 200, being exposed to the outside, increases significantly.

As the surface area of the adhesive layer 200, being exposed to the outside, increases, the lateral surfaces of the adhesive layer 200 may be easily contaminated by equipment for processing such as a robot arm and the like that are used in the processing.

Accordingly, the adhesive material may be detached (A) or escape (B) from the lateral surfaces of the adhesive layer 200, as illustrated in FIG. 2*b*.

Additionally, at high temperature and high humidity, the adhesive material of the adhesive layer 200 has low modulus and high flowability, such that the adhesive material is detached (A) or escapes (B) more frequently due to an increase in the thickness of the adhesive layer 200.

When the adhesive material is detached (A) or escapes (B), the adhesive layer 200 may not function properly, or the adhesive material may contaminate another component in the foldable display device 1, causing an increasing defect rate of the foldable display device 1 and deterioration in reliability.

In the present disclosure, various embodiments of the foldable stack 2, the foldable display device 1 and the manufacturing method thereof that help to reduce folding stress, and defects of the adhesive layer 200 are described as follows.

Figure 3:
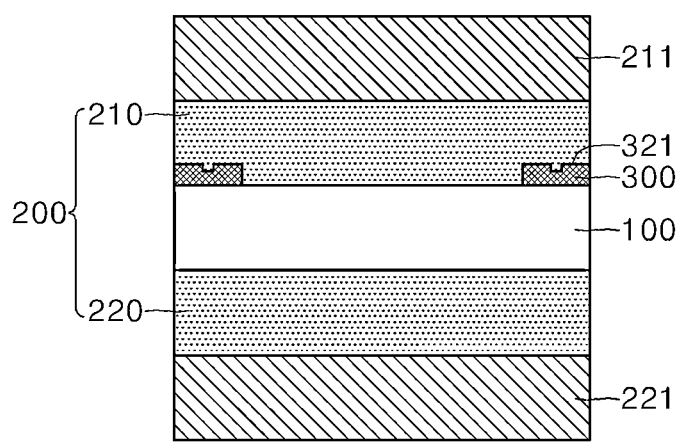
FIG. 3 is a cross-sectional view showing a foldable stack of one embodiment.

FIG. 3 is a cross-sectional view showing a foldable stack 2 of one embodiment.

The foldable stack 2 may include a substrate 100.

In the present disclosure, the substrate 100 may include layers such as a support layer, a polarizing layer, a protective layer, a cover window and a coating layer that are included in the foldable display device 1 and perform various functions. In the case of a foldable display device 1 having additional functional layers, the functional layers may be included in the substrate 100.

A first adhesive layer 210 and a second adhesive layer 220 may be respectively disposed on one surface and the other surface of the substrate 100. That is, the adhesive layer 200 may be respectively disposed on the upper surface and the lower surface of the substrate 100.

The protective film may be disposed on one surface of each of the adhesive layers 200.

Accordingly, a first protective film 211 may be disposed on the first adhesive layer 210, and a second protective film 221 may be disposed under the second adhesive layer 220.

The protective film may prevent the substrate 100 and the adhesive layer 200 from being contaminated or damaged when the foldable stack 2 is stored or moved.

The protective film may be a release film. The foldable stack 2 is moved to another foldable stack 2, the protective films are removed, and then the exposed adhesive layer 200 contacts another foldable stack 2, to stack and fix the foldable stack 2 stably.

That is, at least one of the protective films may be removed before the foldable stack 2 is stacked on another foldable stack 2.

A pattern layer 300 may be disposed along an edge portion on the substrate 100.

The pattern layer 300 may be disposed on one surface of the substrate 100, and disposed between the adhesive layer 200 and the substrate 100.

In FIG. 3, the pattern layer 300 is disposed between the first adhesive layer 210 and the substrate 100 but not limited. For example, the pattern layer 300 may be disposed between the second adhesive layer 220 and the substrate 100.

The adhesive layer 200 in FIG. 3 refers to the first adhesive layer 210 for convenience of description.

The pattern layer 300 may be disposed on the substrate 100, and the adhesive layer 200 may be disposed to cover at least a portion of the pattern layer 300.

Accordingly, the adhesive layer 200 may be disposed to directly contact the substrate 100 and the pattern layer 300.

The adhesive layer 200 may cover the entire area of the pattern layer 300 but not be limited. For example, the adhesive layer 200 may be disposed not to cover an area of the pattern layer 300, which is inserted inward by a predetermined distance from the end portions of the foldable stack 2.

When the area of the edge portion of the foldable stack 2 is removed in the following processing such as trimming processing, the area, being inserted inward by a predetermined distance from the end portions of the foldable stack 2, may be a margin area that is removed and disappears.

The pattern layer 300 may include one or more of protrusion parts 321, and the protrusion parts 321 of the pattern layer 300 may be disposed along the edge portion on the substrate 100.

The one or more of protrusion parts 321 of the pattern layer 300 may be formed, and when a plurality of protrusion parts 321 is provided, each of the protrusion parts 321 may be spaced at predetermined intervals.

Since the pattern layer 300 being formed along the edge portion on the substrate 100 includes one or more of the protrusion parts 321 as described above, the surface area of the lateral surfaces of the adhesive layer 200, which is exposed to the outside, may decrease further.

Accordingly, the adhesive layer 200's defects, caused by the adhesive material's detachment or escape from the lateral surfaces of the adhesive layer 200, may decrease.

Additionally, the pattern layer 300's protrusion part 321 being formed along the edge portion on the substrate 100 may serve as a sort of dam that interferes with the flow of the adhesive material of the adhesive layer 200.

Accordingly, the foldable stack is exposed to an environment having high temperature and humidity, and the modulus of the adhesive material becomes low, and despite an increase in the flowability of the adhesive material, the protrusion part 321 of the pattern layer 300 may control the flow of the adhesive material effectively.

Thus, the control of the flow of the adhesive material may lead to a decrease in the occurrence of the phenomenon in which the adhesive material is detached or escapes.

Hereafter, a manufacturing method of the foldable stack 2, focusing mainly on a method of forming the pattern layer 300, is described with reference to FIGS. 4*a* to 4*c*, 5*a* to 5*c* and 6*a* to 6*c*.

FIGS. 4*a* to 4*c*, 5*a* to 5*c* and 6*a* to 6*c* are process charts of a manufacturing method of a pattern layer in various embodiments.

Figure 4A:
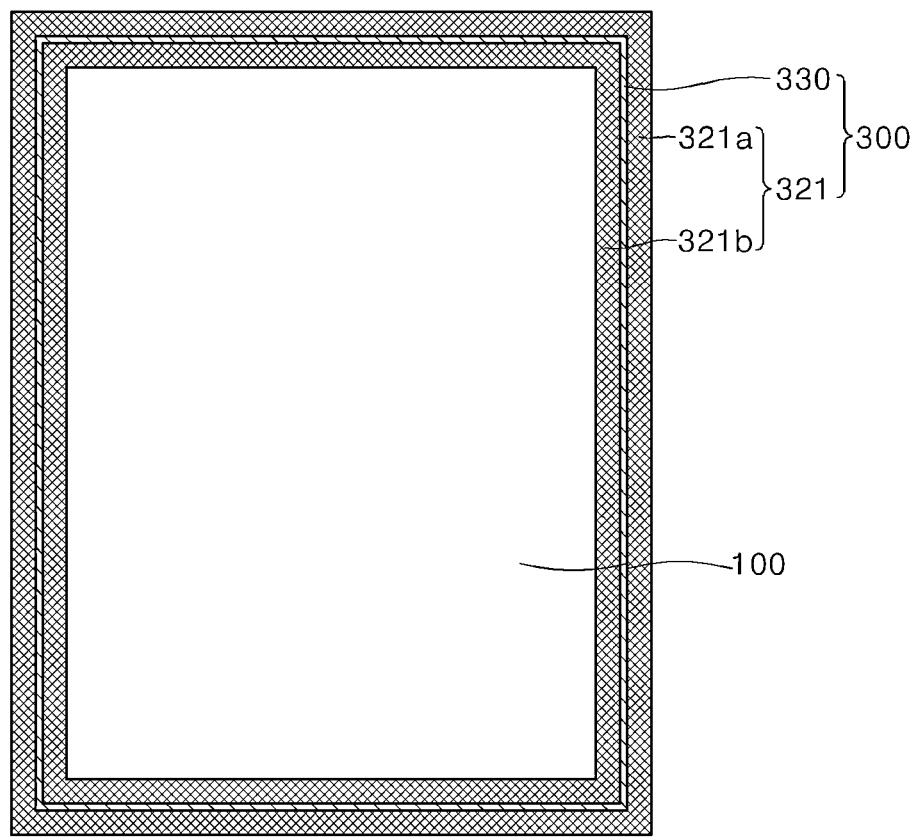
FIGS. 4a to 4c are process charts of a manufacturing method of a foldable stack of one embodiment.

Referring to FIG. 4*a*, the pattern layer 300 being formed on the substrate 100 includes a plurality of protrusion parts 321 including a first convex part 321*a* and a second convex part 321*b*, and the first convex part 321*a* and the second convex part 321*b* may have the substantially same width. For example, the first convex part 321*a* may be a protrusion part, and not limited by the term. For example, the second convex part 321*b* may be a protrusion part, and not limited by the term.

The first convex part 321*a* and the second convex part 321*b* are formed along the edge portion of the substrate 100, and are spaced from each other. Accordingly, a trench part 330 may be formed between the first convex part 321*a* and the second convex part 321*b*.

The trench part 330 of the pattern layer 300 may be formed along the edge portion of the substrate 100.

Figure 4B:
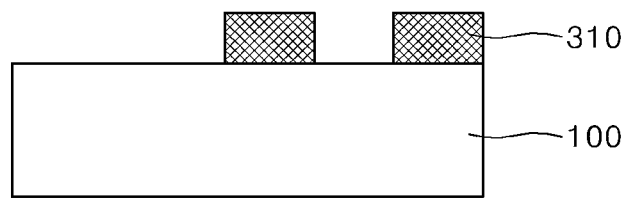
Figure 4C:
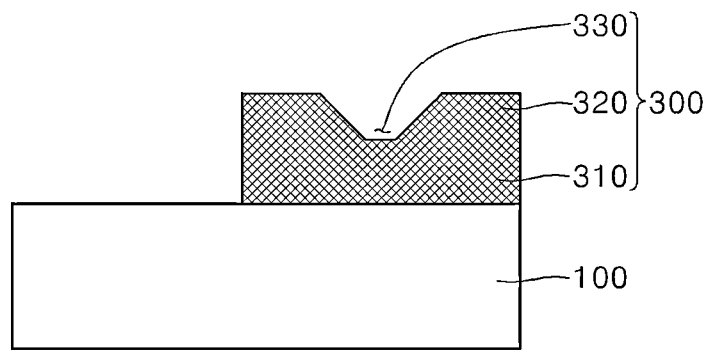

FIGS. 4*b* and 4*c* show a process of forming the trench part 330 of the pattern layer 300.

Referring to FIG. 4b, a plurality of lower pattern layers 310 is primarily printed along the edge portion on the substrate 100 in a way that the lower pattern layers 310 are spaced from each other.

The plurality of lower pattern layers 310 may have the substantially same width.

Then an upper pattern layer 320 is secondarily printed in a way that the upper pattern layer 320 covers the plurality of lower pattern layers 310.

In this case, the same material may be used for the lower pattern layer and the upper pattern layer.

As the upper pattern layer 320 is stacked on the lower pattern layer 310, a pattern layer 300 of a foldable stack 2 may be formed.

Since a space is formed between the plurality of lower pattern layers 310 in the primary printing step, the pattern layer 300 may be formed to include a plurality of protrusion portions 321 after the secondary printing step of printing the upper pattern layer 320, and the plurality of protrusion parts 321 may be spaced along the substrate 100.

Thus, the pattern layer 300 may be formed to include a trench part 330 as well as the plurality of protrusion parts 321, since the trench part 330 is formed between the plurality of protrusion parts 321.

As described above, the manufacturing method of the foldable stack 2 in the embodiments may involve printing the lower pattern layer 310 primarily and printing the upper pattern layer 320 secondarily, to form the pattern layer 300. For example, the manufacturing method of the foldable stack 2 may be a two tone printing method in which the lower pattern layer 310 is printed primarily and then the upper pattern layer 320 is printed secondarily.

Optical density of a predetermined value or greater needs to be ensured to enable the pattern layer 300 to have effective optical properties.

Optical density relates to the thickness of the pattern layer 300. To ensure optical density of a predetermined value or greater, the thickness of the pattern layer 300 needs to increase.

It is very difficult to form a pattern layer 300 having a predetermined thickness or greater in a single printing process.

When a pattern layer 300 is formed using the two tone printing method as in the embodiments, the pattern layer 300 may have a predetermined thickness or greater, thereby ensuring the pattern layer 300's proper optical density.

Further, the trench part 330 may be easily formed along with the plurality of protrusion parts 321 after the secondary printing step, since the plurality of lower pattern layers 310 are formed in the way that the lower pattern layers 310 are spaced from each other in the primary printing step. As a result, the thickness of the pattern layer 300 may increase and have optical density of a predetermined value or greater.

FIGS. 4a to 4c shows that the first convex part 321a and the second convex part 321b have the substantially same width. However, the first convex part 321a and the second convex part 321b may have a different width as illustrated in FIGS. 5a to 5c and 6a to 6c.

Figure 5A:
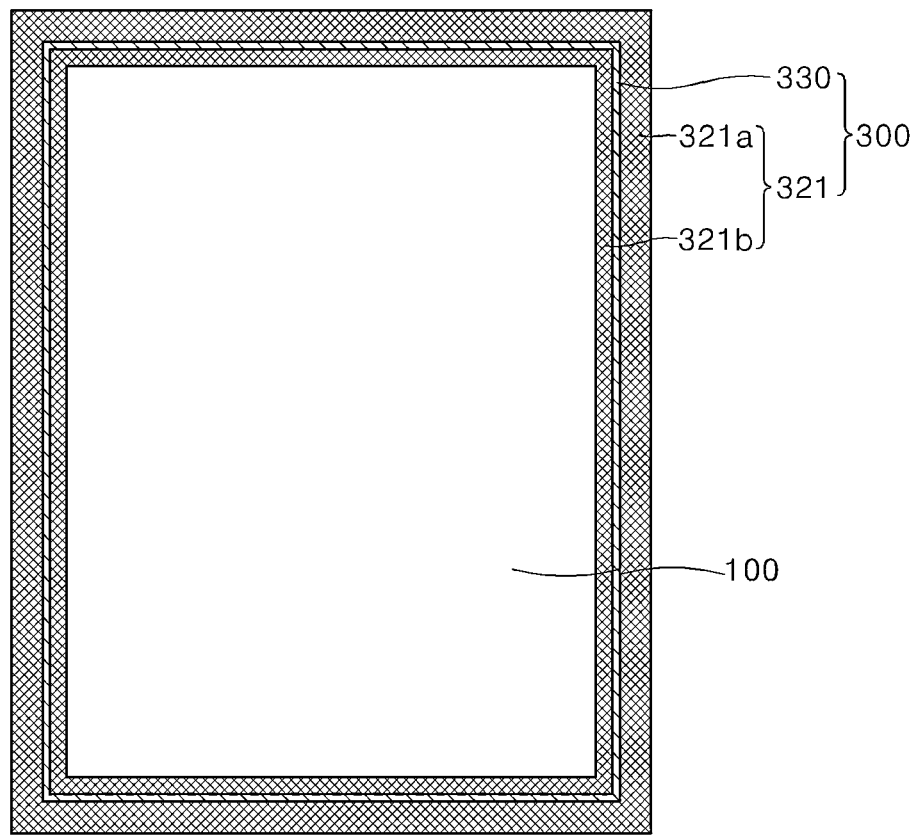
FIGS. 5a to 5c are process charts of a manufacturing method of a foldable stack of another embodiment.

Referring to FIG. 5a, the pattern layer 300 being formed on the substrate 100 includes a plurality of protrusion parts 321 including a first convex part 321a and a second convex part 321b, and the first convex part 321a has a width greater than that of the second convex part 321b.

Accordingly, a trench part 330 being formed between the first convex part 321a and the second convex part 321b in FIG. 5a may be moved further to the inner side of the substrate 100 than in FIG. 4a.

Figure 5B:
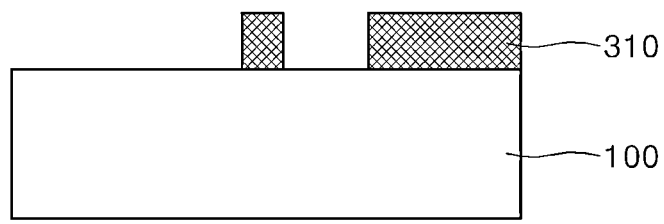

To move the trench part 330 of the pattern layer 300 further to the inner side of the substrate 100, the width of the first convex part 321a needs to be greater than that of the second convex part 321b when the lower pattern layer 310 is printed primarily as illustrated in FIG. 5b.

Since the first convex part 321a and the second convex part 321b are printed in the way that the first convex part 321a and the second convex part 321b are spaced from each other, a space between the first convex part 321a and the second convex part 321b in FIG. 5b may be moved further to the inner side of the substrate 100 than in FIG. 4b.

Figure 5C:
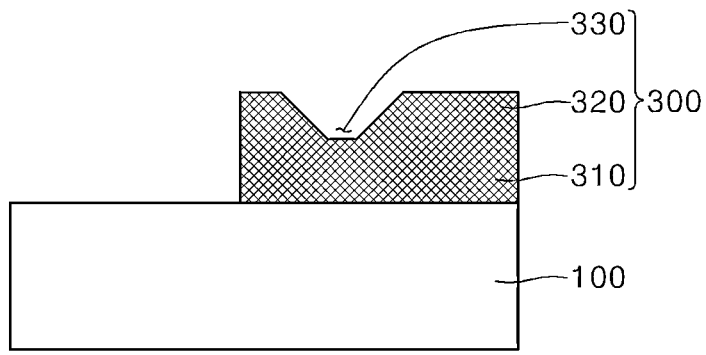

Referring to FIG. 5c, as the upper pattern layer 320 is printed on the lower pattern layer 310 secondarily, the trench part 330 is formed in a position corresponding to the space between the first convex part 321a and the second convex part 321b. Accordingly, the trench part 330 in FIG. 5c may be moved further to the inner side of the substrate 100 than in FIG. 4a.

Figure 6A:
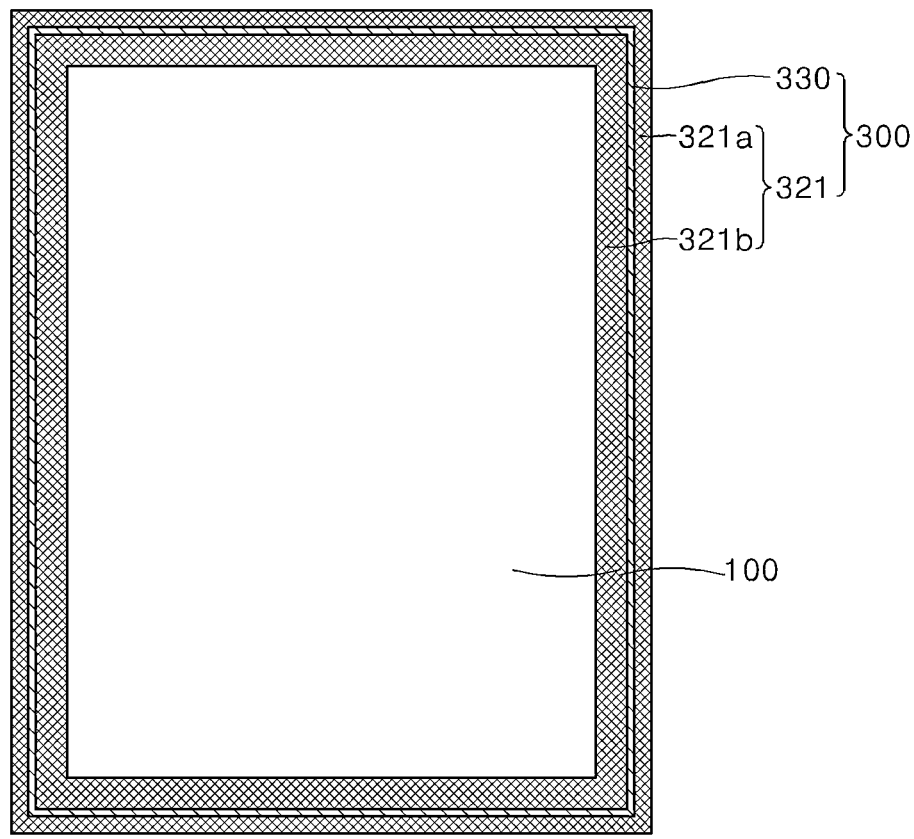
FIGS. 6a to 6c are process charts of a manufacturing method of a foldable stack of yet another embodiment.

Referring to FIG. 6a, the pattern layer 300 being formed on the substrate 100 includes a plurality of protrusion parts 321 including a first convex part 321a and a second convex part 321b, and the first convex part 321a has a width less than that of the second convex part 321b.

Accordingly, the trench part 330 being formed between the first convex part 321a and the second convex part 321b in FIG. 6a may be moved further to the outer side of the substrate 100 than in FIG. 4a.

Figure 6B:
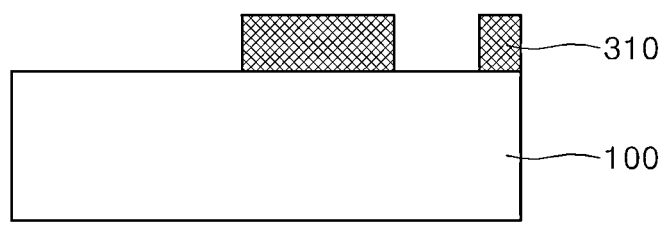

To move the trench part 330 of the pattern layer 300 further to the outer side of the substrate 100, the width of the first convex part 321a may be less than that of the second convex part 321b when the lower pattern layer 310 is printed primarily as illustrated in FIG. 6b.

Since the first convex part 321a and the second convex part 321b are spaced from each other, a space between the first convex part 321a and the second convex part 321b in FIG. 6b may be moved further to the outer side of the substrate 100 than in FIG. 4b.

Figure 6C:
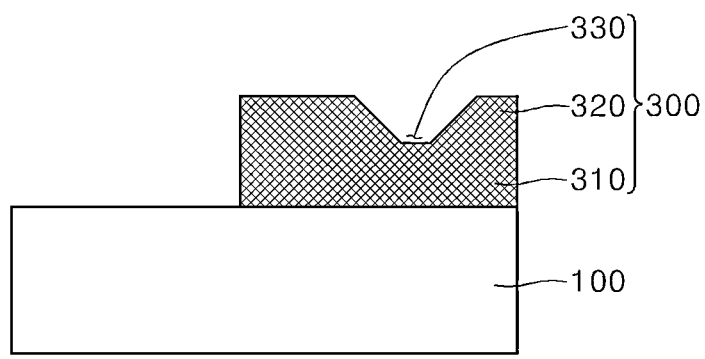

Referring to FIG. 6c, as the upper pattern layer 320 is printed on the lower pattern layer 310 secondarily, the trench part 330 is formed in a position corresponding to the space between the first convex part 321a and the second convex part 321b. Accordingly, the trench part 330 in FIG. 6c may be moved further to the outer side of the substrate 100 than in FIG. 4a.

In the embodiments, the width of the lower pattern layers 310 is adjusted to adjust the position of the space between the lower pattern layers 310 in the step in which the plurality of lower pattern layers 310 is printed primarily in the way that the lower pattern layers 310 are spaced from each other, as described above. Thus, the position in which the trench part 330 of the pattern layer 300 is formed is readily adjusted.

The boundary of the adhesive layer 200 that is formed to cover the pattern layer 300 in the process of manufacturing the foldable stack 2 may be in the trench part 330. The adjustment of the position of the trench part 330 may imply the adjustment of the position of the boundary of the adhesive layer 200.

As the position of the trench part 330 of the pattern layer 300 is adjusted, the position of the boundary of the adhesive layer 200 having different modulus may be easily adjusted.

Hereafter, various embodiments of the trench part 330 in the present disclosure are specifically described with reference to FIGS. 7a to 7c.

A pattern layer 300 may include a body part 311, and one or more of protrusion parts 321 being disposed on the body part 311.

At least one of the protrusion parts 321 may be spaced inward from the end portions of the body part 311 by a predetermined distance.

In the case of a pattern layer 300 including a plurality of protrusion parts 321, the protrusion parts 321 may be spaced a predetermined distance apart from each other.

Accordingly, a trench part that is depressed toward the body part 311 may be formed in a space between the protrusion parts 321 being spaced from each other.

As described above, the pattern layer 300 formed based on two tone printing includes the body part 311, the plurality of protrusion parts 321 being disposed on the body part 311, and the trench part 330 being disposed between the protrusion parts 321.

The one or more of the protrusion parts 321 may be disposed further inward than the end portions of the body part 311.

For example, the surface area of a lower pattern layer 310 formed in a primary printing step may be greater than the surface area of an upper pattern layer 320 formed in a secondary printing step, such that all the plurality of protrusion parts 321 of the pattern layer 300 formed after the two tone printing process is disposed further inward than the end portions of the body part 311.

Figure 7A:
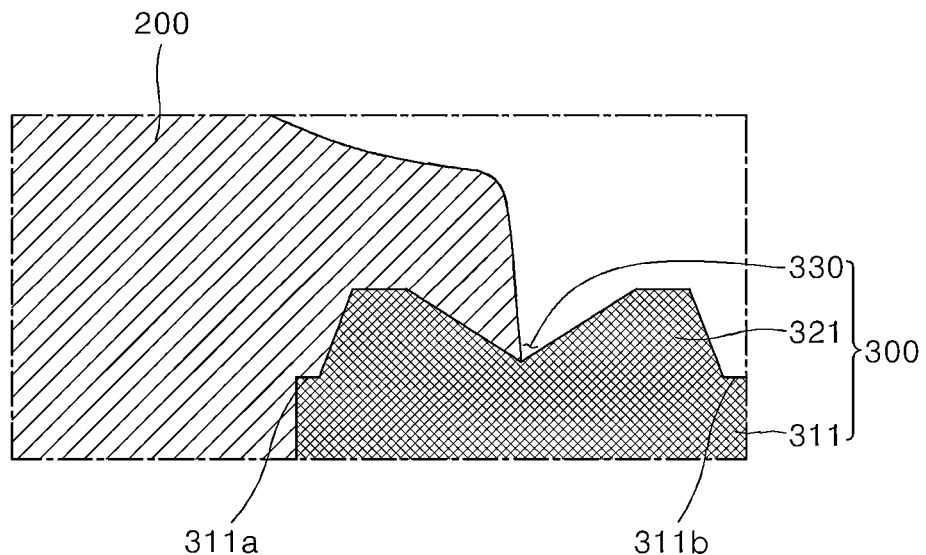
FIGS. 7a to 7c are cross-sectional views showing a pattern layer and an adhesive layer in various embodiments.
Figure 7B:
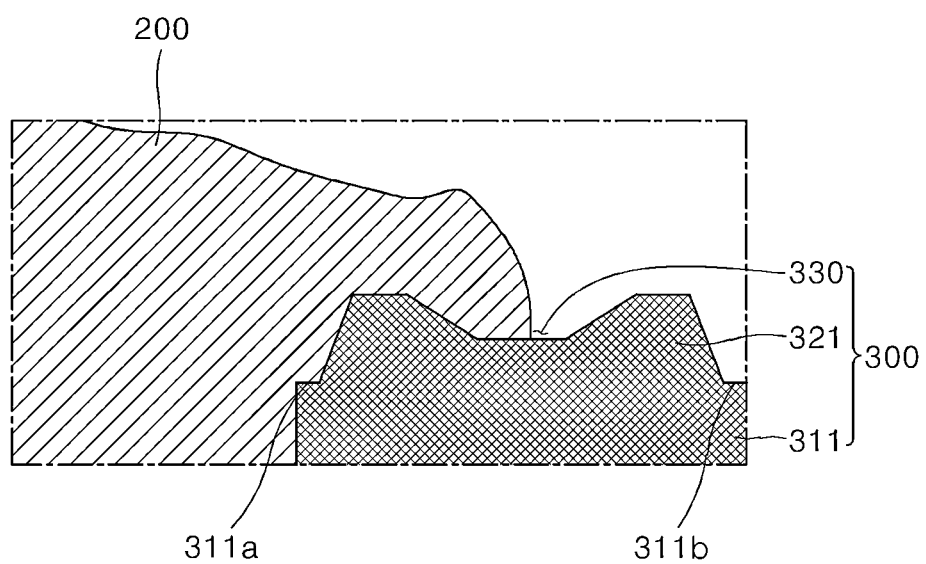
Figure 7C:
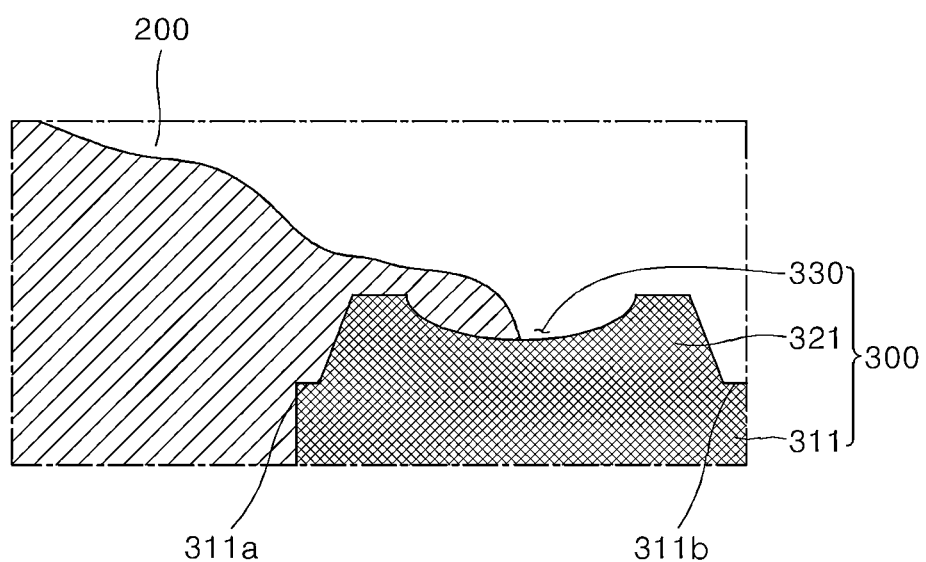

Thus, the plurality of protrusion parts 321 may be disposed further inward than the end portions of the body part 311 by a predetermined distance to have a first margin area 311a and a second margin area 311b, as illustrated in FIGS. 7a to 7c.

After a foldable stack 2 is stacked on another foldable stack 2, a portion of the end of the foldable stack 2 may be removed in a trimming process when necessary. In an additional process, the second margin area 311b being disposed further outward than the first margin area 311a may be removed. For example, the trimming process may include laser cutting and the like but not be limited.

Accordingly, the end portion of one of the plurality of protrusion parts 321 may be aligned with the end portion of the body part 311. The end portion of the other protrusion part 321 including the first margin area 311a may be dispose further inward than the end portion of the body part 311.

For the foldable stack 2 in the embodiments, at least one of the ends of the protrusion part 321 is disposed further inward than the end portion of the body part 311. Accordingly, the protrusion part 321 and the body part 311 may be formed into a step.

As the pattern layer 300 is formed in the way that the protrusion part 321 and the body part 311 have a step shape, folding stress being applied to the pattern layer 300 may decrease.

When the end portions of the protrusion part 321 and the body part 311 are all aligned, an increase in the width and thickness of the pattern layer 300 may result in an increase in the folding stress being focused on the pattern layer 300, when the foldable stack 2 is folded.

For the pattern layer 300 of the foldable stack 2 in the embodiments, the body part 311 has the margin areas partially. Accordingly, the pattern layer 300 has local areas the width and thickness of which decreases, thereby significantly reducing folding stress being applied to the pattern layer 300 when the foldable stack 2 is folded.

The trench part 330 of the pattern layer 300 may be formed into a shape having various cross sections, and its shape may not limited. The trench part 330 may have cross sections such as a reverse triangle in FIG. 7a, a reverse trapezoid in FIG. 7b, and a semicircle in FIG. 7c, for example.

Referring to FIG. 7a, in the case of a trench part 330 having a reverse triangle-shaped cross section, the trench part 330 may be embodied based on a printing method using the step of the lower pattern layer 310.

To embody the trench part 330, silk-screen printing may be applied in an example while photolithography may be applied in another example.

Referring to FIG. 7b, in the case of a trench part 330 having a reverse trapezoid-shaped cross section, photolithography may be applied to embody the trench part 330.

For example, a photoresist film applied using a mask pattern having a predetermined pattern is exposed to light and developed to embody the reverse trapezoid-shaped cross section.

Referring to FIG. 7c, in the case of a trench part 330 having a semicircle-shaped cross section, photolithography may be applied to embody the trench part 330.

For example, a photoresist film applied using a half-tone mask pattern is exposed to light and developed to embody the semicircle-shaped cross section.

The half-tone mask may be formed by inserting a mesh-structured mask pattern, for example.

As described above, the pattern layer 300 in the embodiments is formed using the two tone printing method in which two stages of printing are performed, and then an adhesive layer 200 is formed.

The adhesive layer 200 is formed to cover a substrate 100 and at least a portion of the pattern layer 300 including the lower pattern layer 310 and the upper pattern layer 320, for example.

In this case, the end portion of the adhesive layer 200 may be formed and disposed in a way that the end portion of the adhesive layer 200 overlaps the trench part 330.

Without the trench part 330 in the end portion of the adhesive layer 200 being formed on the pattern layer 300, the end portion of the adhesive layer 200 being formed on the pattern layer 300 would pass the pattern layer 300 and escape out of the foldable stack 2. This phenomenon is referred to as the escape of an adhesive material. To prevent the escape of the adhesive material, a very precise process is required.

For example, the flow viscosity of the adhesive material varies depending on the modulus of the adhesive layer 200. Accordingly, it would be very difficult to determine the position of the boundary of the adhesive layer 200 precisely based on the modulus of the adhesive layer 200 to be used.

In the embodiments, the end portion of the boundary of the adhesive layer 200 is disposed in the trench part 330 of the pattern layer 300, which has a depressed groove. Accordingly, the position of the boundary of the adhesive layer 200 may be adjusted more readily.

The adhesive layer 200 may be made of materials having different modulus. Depending on modulus, the cross section of the trench part 330 may differ.

For example, in the case of an adhesive layer 200 including an adhesive material having relatively high modulus of $1 \times 10^7$ Pa or greater, the flow viscosity of the adhesive layer 200 is high, which means that the adhesive material does not spread widely. Accordingly, the trench part 330 may not have a great width.

When the adhesive layer 200 includes an adhesive material having high modulus, the pattern layer 300 may be formed in a way that the trench part 330 has a reverse triangle-shaped cross section as illustrated in FIG. 7a.

For example, in the case of an adhesive layer 200 including an adhesive material having relatively middle modulus from $1 \times 10^5$ Pa to $1 \times 10^7$ Pa, the flow viscosity of the adhesive layer 200 is at the middle level, and the adhesive material spreads further. Accordingly, the trench part 330 in the adhesive layer 200 including an adhesive material having middle modulus may have a width greater than in the adhesive layer including an adhesive material having high modulus.

When the adhesive layer 200 includes an adhesive material having middle modulus, the pattern layer 300 may be formed in a way that the trench part 330 has a reverse trapezoid-shaped cross section as illustrated in FIG. 7b.

Unlike the reverse triangle-shaped cross section, the reverse trapezoid-shaped cross section has an additional side having a predetermined length. Even if an adhesive material having middle modulus spreads to some degree, the reverse trapezoid-shaped cross section may help to hold a greater amount of the adhesive material in the trench part 330 than the reverse triangle-shaped cross section.

For example, in the case of an adhesive layer 200 including an adhesive material having relatively low modulus of less than $1\times10^5$ Pa, the flow viscosity of the adhesive layer 200 is low, and the adhesive material spreads so widely. Accordingly, the trench part 330 in the adhesive layer 200 including an adhesive material having low modulus may have a width greater than in the adhesive layer including an adhesive material having middle modulus.

When the adhesive layer 200 includes an adhesive material having low modulus, the pattern layer 300 may be formed in a way that the trench part 330 has a semicircle-shaped cross section as illustrated in FIG. 7c.

The semicircle-shaped cross section has a groove wider than the reverse triangle or reverse trapezoid-shaped cross section. Even if an adhesive material having low modulus spreads so widely, the semicircle-shaped cross section may help to hold a greater amount of the adhesive material in the trench part 330 than the reverse triangle or reverse trapezoid-shaped cross section.

As described above, the shape of the trench part 330 of the pattern layer 300 may change depending on the adhesive layer 200's adhesive material having different modulus in the embodiments. Thus, the escape of the adhesive material may decrease readily.

Additionally, one of the ways of adjusting the position of the boundary of the adhesive layer 200 includes changing the position of the trench part 330 that is formed as a result of adjustment of the position of the space between the lower pattern layers 310, as illustrated in FIGS. 4a to 4c, 5a to 5c and 6a to 6c.

In the embodiments, since the position of the trench part 330 of the pattern layer 300 may change depending on the adhesive layer 200's adhesive material having different modulus, the escape of the adhesive material may decrease readily.

Hereafter, a foldable stack 2 in various other embodiments is described with reference to FIGS. 8a to 8c, 9a to 9c, 10a to 10c and 11a to 11d.

The foldable stack 2 may include a first substrate 100a, and a first pattern layer 300a being disposed along the edge portion of the first substrate 100a.

An adhesive layer 200 that covers at least a portion of the first substrate 100a and the first pattern layer 300a is formed on the first substrate 100a.

A second substrate 100b is formed on the adhesive layer 200, and a second pattern layer 300b is formed between the adhesive layer 200 and the second substrate 100b along the edge portion of the second substrate 100b.

The first pattern layer 300a includes one or more of first protrusion parts 301a, and the second pattern layer 300b includes one or more of second protrusion parts 301b.

For example, the first pattern layer 300a is formed on the upper surface of the first substrate 100a, and the second pattern layer 300b is formed on the lower surface of the second substrate 100b. The first pattern layer 300a and the second patter layer 300b may be formed to face each other with the adhesive layer 200 therebetween.

Accordingly, the adhesive layer 200 may directly contact the first substrate 100a, the first pattern layer 300a, the second substrate 100b and the second pattern layer 300b.

The second pattern layer 300b may be disposed to correspond to the first pattern layer 300a. The first protrusion part 301a and the second protrusion part 301b may be formed along the edge portions of the first substrate 100a and the second substrate 100b.

In other embodiments, one surface of the adhesive layer 200 being disposed between the first substrate 100a and the second substrate 100b contacts the first protrusion part 301a of the first pattern layer 300a, and the other surface of the adhesive layer 200 contacts the second protrusion part 301b of the second pattern layer 300b. Thus, the surface area of the lateral surfaces of the adhesive layer 200, being exposed to the outside, may decrease further, as described above.

Further, since the protrusion part is formed on both of one surface and the other surface of the adhesive layer 200, the flow of an adhesive material may be prevent more effectively and readily even if the adhesive material having high flowability is used.

In other embodiments, the defects of the adhesive layer 200, caused by the detachment or escape of the adhesive material, may decrease significantly.

The first pattern layer 300a and the second pattern layer 300b, which are disposed respectively in the edge portion of the first substrate 100a and the second substrate 100b with the adhesive layer 200 therebetween, may serve as a cohesion and alignment key, and align and stack the plurality of layers readily.

The alignment key may be used to accurately align and stack the plurality of layers in intended positions.

For example, the alignment key may take advantage of optical properties such as transmittance or reflection. The pattern layer needs to ensure optical density to such a degree that the pattern layer is used as the alignment key.

In relation to this, the first pattern layer 300a and the second pattern layer 300b in the embodiments may form a pattern layer having a predetermined thickness readily using the two tone printing method, and ensure optical density effectively to the degree that the first pattern layer 300a and the second pattern layer 300b are used as the alignment key.

Since the pattern layers 300a, 300b are respectively formed on the different substrates 100a, 100b, the pattern layer 300a, 300b being formed on each substrate 100a, 100b may be used as the cohesion and alignment key when each of the substrates 100a, 100b is stacked, in the embodiments.

Additionally, since each of the pattern layers 300a, 300b includes the protrusion part 301a, 301b, a camera used for alignment may recognize protruding patterns when the camera recognizes the boundary surface of the pattern layers 300a, 300b, in the embodiments. Thus, the camera may confirm the boundary surface of the alignment key more accurately.

Figure 8A:
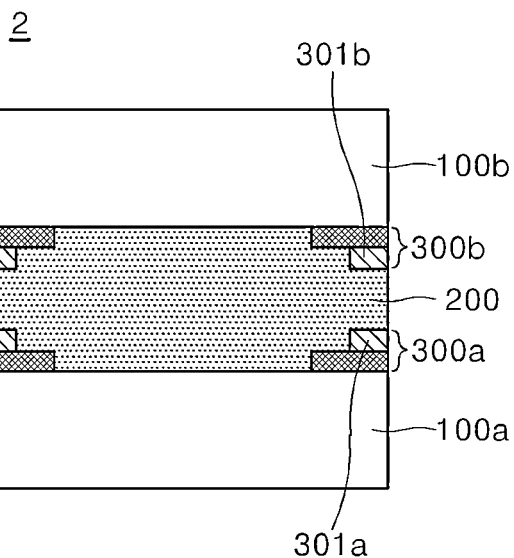
FIGS. 8a to 8c are a cross-sectional view showing a foldable stack of another embodiment and a plan view thereof.
Figure 8B:
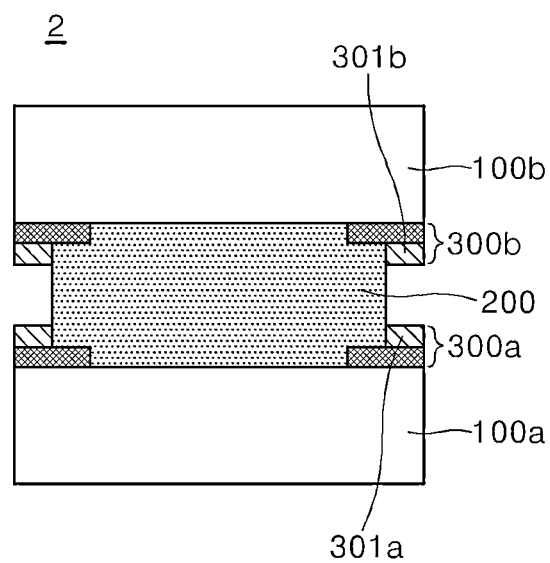
Figure 8C:
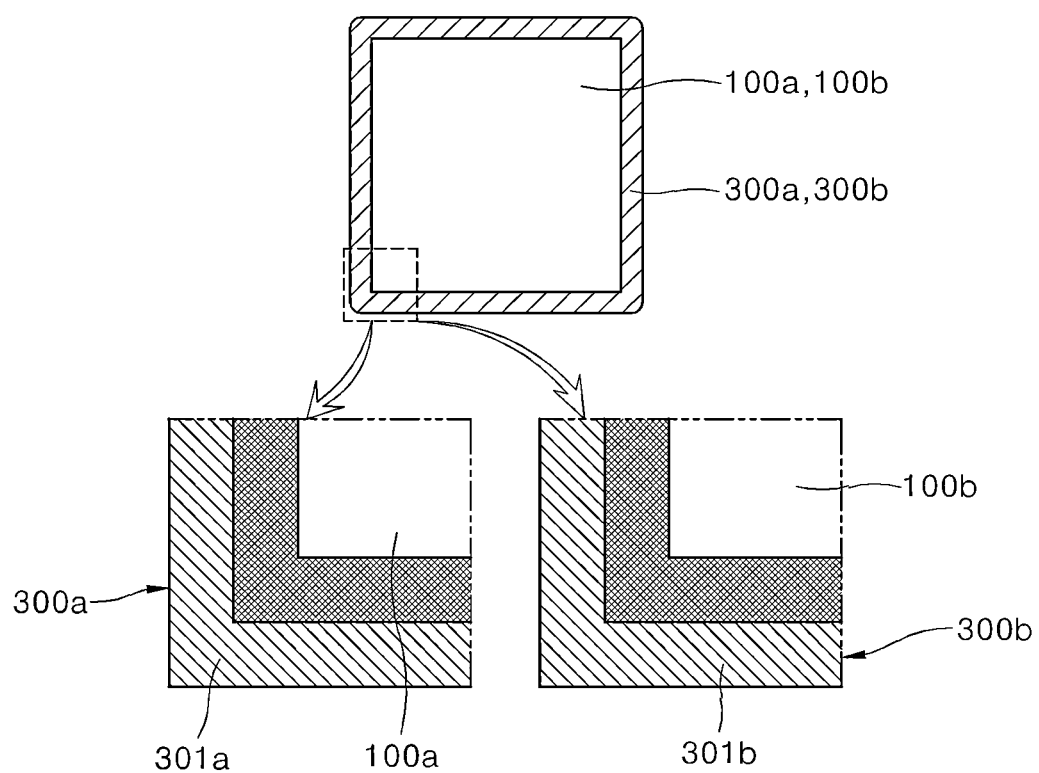

As illustrated in FIGS. 8a, 8b and 8c, the first pattern layer 300a and the second pattern layer 300b may have the same pattern or the same shape.

FIG. 8a shows that the boundary surfaces of the ends of the adhesive layer 200 align with the boundary surfaces of the ends of the first pattern layer 300a and the second pattern layer 300b, and FIG. 8b shows that the boundary surfaces of the ends of the adhesive layer 200 are disposed further inward than the boundary surfaces of the ends of the first pattern layer 300a and the second pattern layer 300b.

The positions of the boundary surfaces of the ends of the adhesive layer 200 may differ depending on the modulus of an adhesive material used for the adhesive layer 200.

Additionally, the positions of the boundary surfaces of the ends of the adhesive layer 200 may differ depending on whether a process of trimming the end portions of the foldable stack 2 is performed.

Referring to FIG. 8c, the first pattern layer 300a on the first substrate 100a and the second pattern layer 300b on the second substrate 100b may have the same shape or the same pattern. For example, the first pattern layer 300a on the first substrate 100a and the second pattern layer 300b on the second substrate 100b may be formed symmetrically.

Referring to FIGS. 8a, 8b and 8c, a single protrusion part 301a, 301b is formed on each pattern layer 300a, 300b. However, a plurality of protrusion parts may be provided as illustrated in FIGS. 9a, 9b and 9c.

Figure 9A:
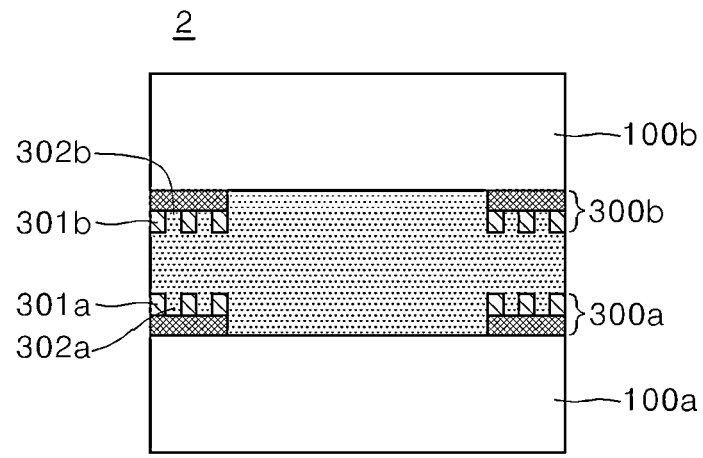
FIGS. 9a to 9c are a cross-sectional view showing a foldable stack of another embodiment and a plan view thereof.
Figure 9B:
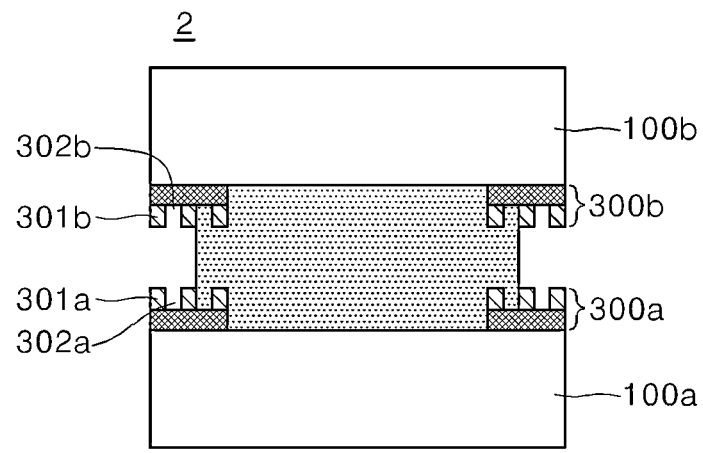
Figure 9C:
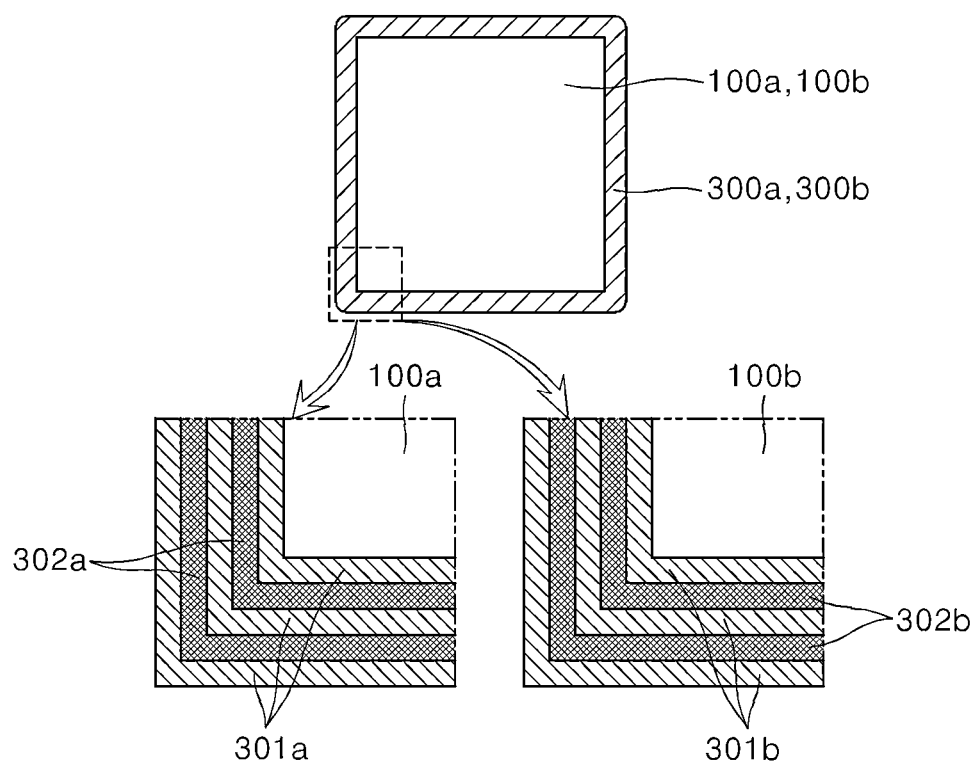

For example, when each pattern layer has a plurality of protrusion parts as illustrated in FIGS. 9a, 9b and 9c, the first pattern layer 300a and the second pattern layer 300b may have the same pattern.

FIG. 9a shows that the boundary surfaces of the ends of the adhesive layer 200 align with the boundary surfaces of the ends of the first pattern layer 300a and the second pattern layer 300b, and FIG. 9b shows that the boundary surfaces of the ends of the adhesive layer 200 are disposed further inward than the boundary surfaces of the ends of the first pattern layer 300a and the second pattern layer 300b.

One or more trench parts 302a, 302b may be formed between the plurality of protrusion parts 301a, 301b.

Accordingly, one or more first trench parts 302a may be formed among a plurality of first protrusion parts 301a, and one or more second trench parts 302b may be formed among a plurality of second protrusion parts 301b.

The positions of the boundary surfaces of the ends of the adhesive layer 200 may differ depending on the modulus of an adhesive material used for the adhesive layer 200.

Additionally, the positions of the boundary surfaces of the ends of the adhesive layer 200 may differ depending on whether a process of trimming the end portions of the foldable stack 2 is performed.

Referring to FIG. 9c, the first pattern layer 300a on the first substrate 100a and the second pattern layer 300b on the second substrate 100b may have the same pattern or the same shape. For example, the first pattern layer 300a on the first substrate 100a and the second pattern layer 300b on the second substrate 100b may be formed symmetrically.

As illustrated in FIGS. 9a, 9b and 9c, each pattern layer 300a, 300b includes the plurality of trench parts 302a, 302b along with the plurality of protrusion parts 301a, 301b, thereby controlling the flow of the adhesive material of the adhesive layer 200 more effectively.

Figure 10A:
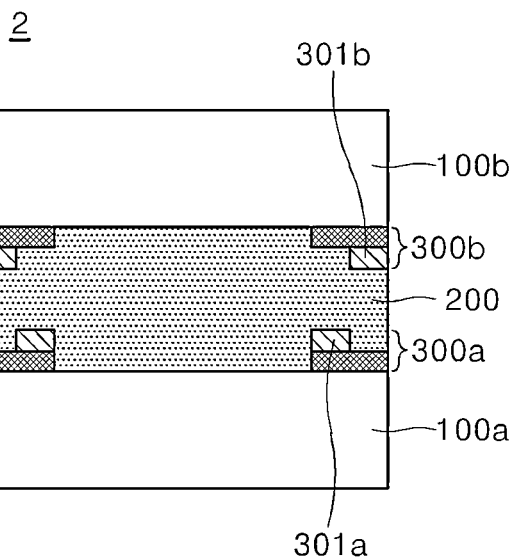
FIGS. 10a to 10c are a cross-sectional view showing a foldable stack of another embodiment and a plan view thereof.
Figure 10B:
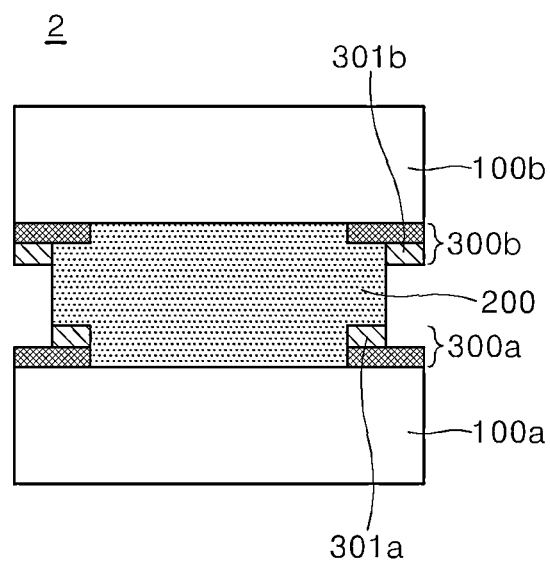
Figure 10C:
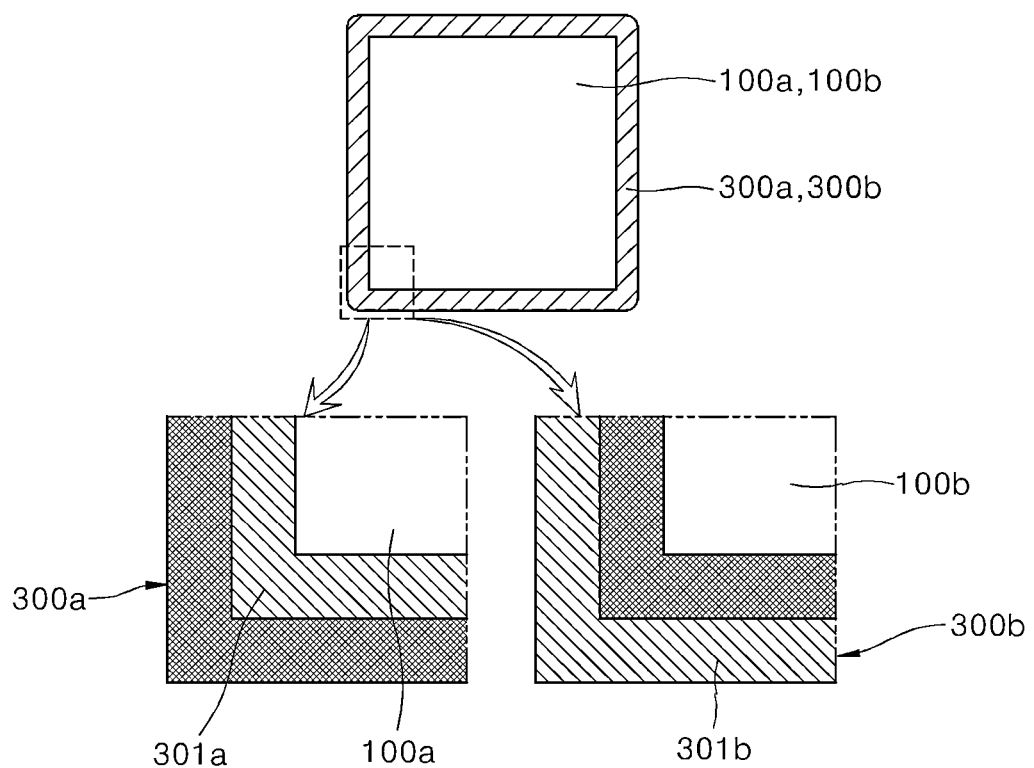

As illustrated in FIGS. 10a, 10b and 10c, the first pattern layer 300a and the second pattern layer 300b may have a different pattern.

FIG. 10a shows that the boundary surfaces of the ends of the adhesive layer 200 align with the boundary surfaces of the ends of the first pattern layer 300a and the second pattern layer 300b, and FIG. 10b shows that the boundary surfaces of the ends of the adhesive layer 200 is disposed further inward than the boundary surfaces of the ends of the first pattern layer 300a and the second pattern layer 300b.

The positions of the boundary surfaces of the ends of the adhesive layer 200 may differ depending on the modulus of an adhesive material used for the adhesive layer 200.

Additionally, the positions of the boundary surfaces of the ends of the adhesive layer 200 may differ depending on whether a process of trimming the end portions of the foldable stack 2 is performed.

Referring to FIG. 10c, the first pattern layer 300a on the first substrate 100a and the second pattern layer 300b on the second substrate 100b may have a different pattern or a different shape.

For example, the first protrusion part 301a of the first pattern layer 300a and the second protrusion part 301b of the second pattern layer 300b may be disposed not to overlap each other.

For example, the first pattern layer 300a and the second pattern layer 300b are disposed to overlap each other in a direction perpendicular to the first substrate 100a and the second substrate 100b, and the first protrusion part 301a of the first pattern layer 300a and the second protrusion part 301b of the second pattern layer 300b may be patterned not to overlap each other perpendicularly.

In the first protrusion part 301a and the second protrusion part 301b having the same pattern, the thickness of the area where the first protrusion part 301a and the second protrusion part 301b overlap may be greater than the thickness of the entire pattern layer 300a, 300b, when the area is viewed perpendicularly.

In the pattern layer 300a, 300b having a partial area that is thick, a blemish (e.g., mura) may occur around the area where the protrusion parts 301a, 301b of the pattern layers 300a, 300b overlap, when the area is viewed perpendicularly.

When the first protrusion part 301a of the first pattern layer 300a and the second protrusion part 301b of the second pattern layer 300b are disposed not to overlap each other, for example, the thickness of a certain area of the pattern layer 300a, 300b may not increase excessively.

In other embodiments, when the first protrusion part 301a of the first pattern layer 300a and the second protrusion part 301b of the second pattern layer 300b are disposed not to overlap each other, the occurrence of a blemish (e.g., mura) caused by the pattern layer 300a, 300b may decrease as much as possible even when the pattern layers 300a, 300b are viewed perpendicularly.

FIGS. 10a, 10b and 10c shows that a single protrusion part 301a, 301b is formed on each pattern layer 300a, 300b. However, a plurality of protrusion parts may be formed as illustrated in FIGS. 11a, 11b, 11c and 11d.

Figure 11A:
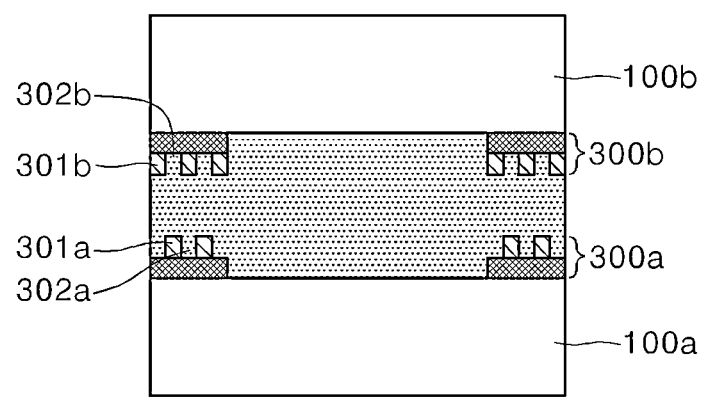
FIGS. 11a to 11d are a cross-sectional view showing a foldable stack of yet another embodiment and a plan view thereof.
Figure 11B:
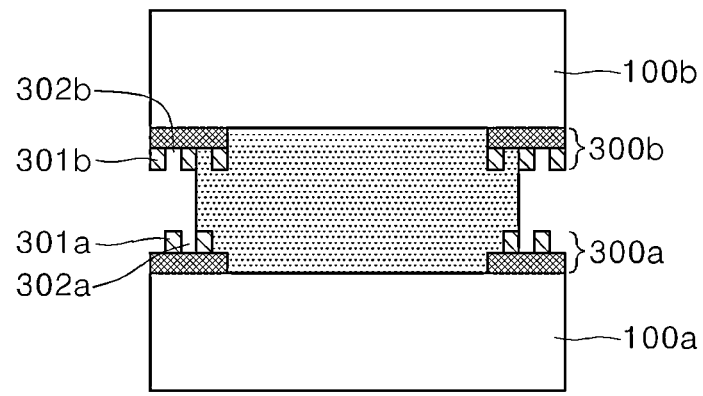
Figure 11C:
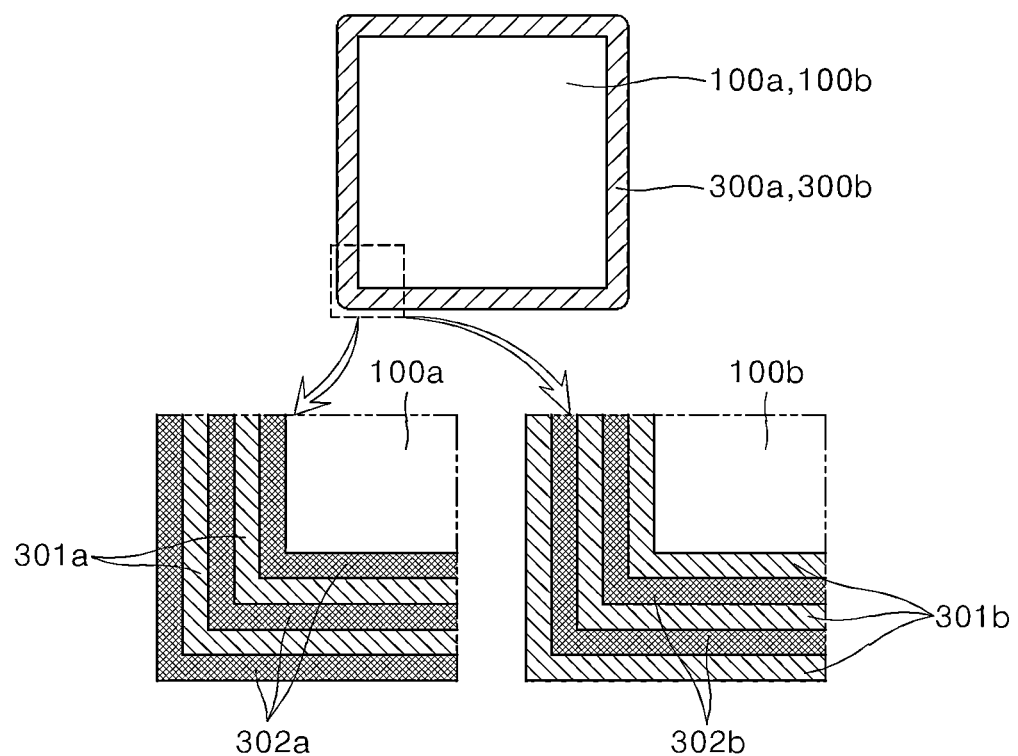

For example, when each pattern layer 300 has a plurality of protrusion parts 321 as illustrated in FIGS. 11a, 11b and 11c, the first pattern layer 300a and the second pattern layer 300b may have a different pattern.

FIG. 11a shows that the boundary surfaces of the ends of the adhesive layer 200 align with the boundary surfaces of the ends of the first pattern layer 300a and the second pattern layer 300b, and FIG. 11b shows that the boundary surfaces of the ends of the adhesive layer 200 are disposed further inward than the boundary surfaces of the ends of the first pattern layer 300a and the second pattern layer 300b.

One or more trench parts 302a, 302b may be formed between the plurality of protrusion parts 301a, 301b.

Accordingly, one or more first trench parts 302a may be formed among a plurality of first protrusion parts 301a, and one or more second trench parts 302b may be formed among a plurality of second protrusion parts 301b.

The positions of the boundary surfaces of the ends of the adhesive layer 200 may differ depending on the modulus of an adhesive material used for the adhesive layer 200.

Additionally, the positions of the boundary surfaces of the end portions of the adhesive layer 200 may differ depending on whether a process of trimming the ends of the foldable stack 2 is performed.

As illustrated in FIGS. 11a, 11b, 11c and 11d, each pattern layer 300a, 300b includes the plurality of trench parts 302a, 302b along with the plurality of protrusion parts 301a, 301b, thereby controlling the flow of the adhesive material of the adhesive layer 200 more effectively.

Referring to FIG. 11c, the first pattern layer 300a on the first substrate 100a and the second pattern layer 300b on the second substrate 100b may have a different pattern or a different shape.

For example, the first protrusion part 301a of the first pattern layer 300a and the second protrusion part 301b of the second pattern layer 300b may be disposed not to overlap each other.

For example, the first pattern layer 300a and the second pattern layer 300b are disposed to overlap each other in a direction perpendicular to the first substrate 100a and the second substrate 100b, and the first protrusion part 301a of the first pattern layer 300a and the second protrusion part 301b of the second pattern layer 300b may be patterned not to overlap each other perpendicularly.

Thus, the first protrusion part 301a of the first pattern layer 300a and the second trench part 302b of the second pattern layer 300b may be formed to overlap each other, and the first trench part 302a of the first pattern layer 300a and the second protrusion part 301b of the second pattern layer 300b may be formed to overlap each other, when viewed perpendicularly.

As described above, in the pattern layer 300a, 300b having a partial area that is thick, a blemish (e.g., mura) may occur around the area where the protrusion parts 301a, 301b of the pattern layers 300a, 300b overlap, when the area is viewed perpendicularly.

According to the present disclosure, when the first protrusion part 301a of the first pattern layer 300a and the second protrusion part 301b of the second pattern layer 300b are disposed not to overlap each other, the thickness of a certain area of the pattern layer 300a, 300b may not increase excessively.

In other embodiments, when the first protrusion part 301a of the first pattern layer 300a and the second protrusion part 301b of the second pattern layer 300b are disposed not to overlap each other, the occurrence of a blemish (e.g., mura) caused by the pattern layer 300 may decrease as much as possible even when the pattern layers 300a, 300b are viewed perpendicularly.

Figure 11D:
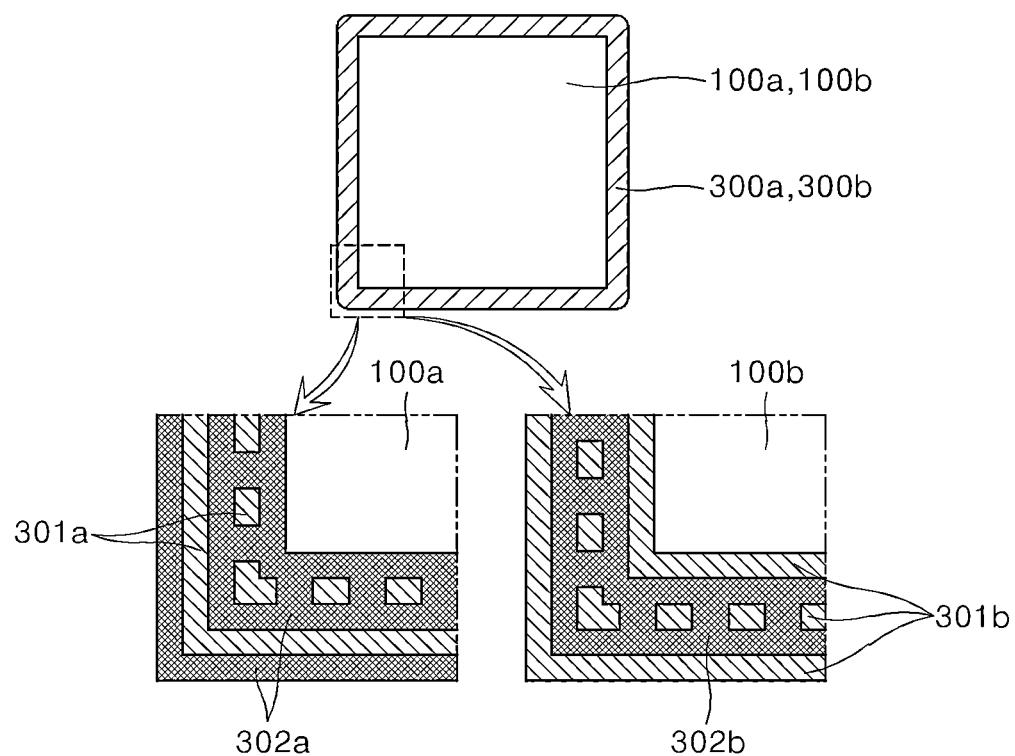

Referring to FIG. 11d, one or more of the first protrusion parts 301a and the second protrusion parts 301b may be formed to have a discontinuous pattern along the edge portion of the substrate 100.

When a portion of the protrusion parts 301a, 301b have a discontinuous pattern rather than a continuous pattern along the edge portion of the substrate 100, the pattern layer 300 may be less affected by folding stress.

Accordingly, when at least one protrusion part 301a, 301b of the plurality of protrusion parts 301a, 301b has a discontinuous pattern, folding stress being applied to the pattern layer 300a, 300b of the foldable stack may decrease than when all the protrusion parts 301a, 301b have a continuous pattern.

The substrate 100 in the above-described foldable stack 2 may be one or more of the coating layer, the cover window, the protective layer and the polarizing layer.

Thus, the foldable stack 2 in the above embodiments may be disposed on one surface of the display panel, and stacked on top of one another to constitute the foldable display device 1.

The foldable stack in the embodiments can be described as follows.

The foldable stack in the embodiments includes a substrate, a pattern layer being disposed along an edge portion on the substrate and including one or more of protrusion parts, and an adhesive layer being disposed on the substrate and covering at least a portion of the pattern layer.

In several embodiments, the protrusion part may be placed along the edge portion.

In several embodiments, the adhesive layer may directly contact the substrate and the pattern layer.

In several embodiments, the pattern layer includes a body part and at least one of protrusion parts on the body part, and at least one of the protrusion parts may be spaced inward from the end portion of the body part by a predetermined distance.

The foldable stack in the embodiments includes a first substrate, a first pattern layer being disposed along the edge portion of the first substrate, an adhesive layer covering the first substrate and at least a portion of the first pattern layer, a second substrate being disposed on the adhesive layer, and a second pattern layer being disposed between the adhesive layer and the second substrate and being disposed along the edge portion of the second substrate. The first pattern layer includes one or more of first protrusion parts, and the second pattern layer includes one or more of second protrusion parts.

In several embodiments, the second pattern layer may be disposed to correspond to the first pattern layer.

In several embodiments, the first protrusion part is disposed along the edge portion of the first substrate, and the second protrusion part is disposed along the edge portion of the second substrate.

In several embodiments, the adhesive layer may directly contact the first substrate, the first pattern layer, the second substrate and the second pattern layer.

In several embodiments, the first pattern layer and the second pattern layer may have the same shape.

In several embodiments, the first pattern layer and the second pattern layer may have a different shape.

In several embodiments, one or more of the first protrusion parts of the first pattern layer and one or more of the second protrusion parts of the second pattern layer may be disposed not to overlap each other.

In several embodiments, one or more of the first protrusion parts have a discontinuous pattern along the edge portion of the first substrate, and/or one or more of the second protrusion parts have a discontinuous pattern along the edge portion of the second substrate.

The foldable stack in the embodiments comprises: a substrate; a pattern layer being disposed along an edge portion on the substrate and comprising a body part, a plurality of protrusion parts being disposed on the body part and a trench part being disposed between the plurality of protrusion parts; and an adhesive layer being disposed on the substrate and an end portion of which overlaps the trench part.

In several embodiments, one or more of the plurality of protrusion parts are disposed further inward than end portions of the body part.

In several embodiments, the trench part has cross sections of a reverse triangle, a reverse trapezoid, or a semicircle.

In several embodiments, the shape of cross sections of the trench part are disposed depending on modulus of the adhesive layer's adhesive material.

The foldable display device in the embodiments can be described as follows.

The foldable display device in the embodiments includes the foldable stack in the embodiments, and a display panel being disposed on one surface of the foldable stack.

In several embodiments, the substrate may be one or more of a coating layer, a cover window, a protective layer, and a polarizing layer.

The manufacturing method of a foldable stack in one embodiment can be described as follows.

The manufacturing method of a foldable stack in the embodiment includes primarily printing a plurality of lower pattern layers along an edge portion on a substrate in a way that the lower pattern layers are spaced from each other, secondarily printing an upper pattern layer to cover the plurality of lower pattern layers, and forming an adhesive layer to cover the substrate and at least a portion of the lower pattern layer and the upper pattern layer.

In several embodiments, a pattern layer in which the lower pattern layer and the upper pattern layer are stacked may include a plurality of protrusion parts.

In several embodiments, a trench part may be formed on the pattern layer, and have a cross section of one of a reverse triangle, a reverse trapezoid and a semicircle.

In several embodiments, the end portion of the adhesive layer may be formed and disposed in a way that the end portion overlaps the trench part.

It will be apparent to those skilled in the art that various modifications and variations can be made in the foldable stack and a foldable display device and the manufacturing method thereof of the present disclosure without departing from the technical idea or scope of the disclosure. Thus, it is intended that the present disclosure cover the modifications and variations of this disclosure provided they come within the scope of the appended claims and their equivalents.

The invention claimed is:

1. A foldable stack, comprising:
   a substrate;
      a pattern layer extending around an entire perimeter of the substrate and being disposed along an edge portion on the substrate, the pattern layer comprising a body part and one or more of protrusion parts, wherein the one or more protrusion parts comprise a first surface and a second surface opposite the first surface; and
      an adhesive layer being disposed on the substrate and covering at least a portion of the pattern layer,
         wherein a bottom surface of the body part is disposed on an upper surface of the substrate, and
         wherein the one or more protrusion parts extend upwardly from an upper surface of the body part.

2. The foldable stack of claim 1, wherein one or more of the protrusion parts are disposed along the edge portion.

3. The foldable stack of claim 1, wherein the adhesive layer contacts the substrate and the second surface of the one or more protrusions of the pattern layer directly.

4. The foldable stack of claim 1, wherein the one or more protrusion parts are spaced inward from an end portion of the body part by a predetermined distance.

5. The foldable stack of claim 1, wherein the first surface is disposed proximate the substrate and the adhesive layer covers the second surface of the plurality of protrusion parts.

6. A foldable stack, comprising:
   a first substrate;
   a first pattern layer extending around an entire perimeter of the first substrate and being disposed along an edge portion of the first substrate and comprising one or more first protrusion parts;
   an adhesive layer having a first end and a second end opposite the first end, covering the first substrate and at least a portion of the first pattern layer;
   a second substrate being disposed on the adhesive layer; and
   a second pattern layer extending around a perimeter of the second substrate and being disposed along an edge portion of the second substrate and comprising one or more of second protrusion parts.

7. The foldable stack of claim 6, wherein the second pattern layer is disposed to correspond to the first pattern layer.

8. The foldable stack of claim 6, wherein the first protrusion part is disposed along the edge portion of the first substrate, and the second protrusion part is disposed along the edge portion of the second substrate.

9. The foldable stack of claim 6, wherein the adhesive layer contacts the first substrate, the first pattern layer, the second substrate and the second pattern layer directly.

10. The foldable stack of claim 6, wherein the first pattern layer and the second pattern layer have a same shape.

11. The foldable stack of claim 6, wherein a shape of the first pattern layer differs from a shape of the second pattern.

12. The foldable stack of claim 11, wherein one or more of the first protrusion parts of the first pattern layer and one or more of the second protrusion parts of the second pattern layer are disposed not to overlap each other.

13. The foldable stack of claim 6, wherein one or more of the first protrusion parts have a discontinuous pattern along the edge portion of the first substrate; and/or
   one or more of the second protrusion parts have a discontinuous pattern along the edge portion of the second substrate.

14. The foldable stack of claim 6, wherein the first substrate is disposed adjacent the first end of the adhesive layer and the second substrate is disposed adjacent the second end of the adhesive layer such that the first substrate and the second substrate are spaced apart.

15. A foldable stack, comprising:
   a substrate;
   a pattern layer extending around an entire perimeter of the substrate and being disposed along an edge portion on the substrate and comprising a body part, a plurality of protrusion parts being extending from the body part and a trench part being disposed between the plurality of protrusion parts; and
   an adhesive layer being disposed on the substrate and an end portion of which overlaps the trench part,
      wherein a bottom surface of the body part is disposed on an upper surface of the substrate, and
      wherein the plurality of protrusion parts extend upwardly from an upper surface of the body part.

16. The foldable stack of claim 15, wherein a bottom surface of the body forms the first surface such that the bottom surface is disposed proximate the substrate, and wherein one or more of the plurality of protrusion parts are disposed further inward than end portions of the body part.

17. The foldable stack of claim 15, wherein the trench part has cross sections of a reverse triangle, a reverse trapezoid, or a semicircle.

18. The foldable stack of claim 17, wherein the shape of cross sections of the trench part are disposed depending on modulus of the adhesive layer's adhesive material.

19. The foldable stack of claim 15, wherein the plurality of protrusion parts comprise a first surface and a second surface opposite the first surface, and
wherein the first surface is disposed proximate the substrate and the adhesive layer covers the second surface of the plurality of protrusion parts.

20. A foldable display device, comprising:
a foldable stack; and
a display panel being disposed on one surface of the foldable stack,
wherein the foldable stack, includes:
a substrate;
a pattern layer extending around an entire perimeter of the substrate and being disposed along an edge portion on the substrate, the pattern layer comprising a body part and one or more of protrusion parts; and
an adhesive layer being disposed on the substrate and covering at least a portion of the pattern layer,
wherein a bottom surface of the body part is disposed on an upper surface of the substrate, and
wherein the one or more protrusion parts extend upwardly from an upper surface of the body part.

21. The foldable display device of claim 20, wherein the substrate is one or more of a coating layer, a cover window, a protective layer, and a polarizing layer.

22. The foldable display device of claim 20, wherein the one or more protrusion parts comprise a first surface and a second surface opposite the first surface,
wherein the first surface is disposed proximate the substrate and the adhesive layer covers the second surface of the plurality of protrusion parts.

* * * * *